United States Patent [19]

Lagsdin

[11] Patent Number: 5,667,245
[45] Date of Patent: *Sep. 16, 1997

[54] STABILIZER PAD FOR VEHICLES

[76] Inventor: Andry Lagsdin, 54 King Hill Rd., Hanover, Mass. 02339

[*] Notice: The term of this patent shall not extend beyond the expiration date of Pat. No. 5,466,004.

[21] Appl. No.: 525,865

[22] Filed: Sep. 8, 1995

Related U.S. Application Data

[63] Continuation-in-part of Ser. No. 398,866, Mar. 6, 1995, Pat. No. 5,547,220, which is a continuation-in-part of Ser. No. 283,247, Jul. 29, 1994, Pat. No. 5,466,004.

[51] Int. Cl.$^6$ ........................ B60S 9/02
[52] U.S. Cl. ............... 280/763.1; 280/764.1; 212/301; 212/304
[58] Field of Search ............. 280/764.1, 763.1; 212/301, 303, 304, 305; 305/51, 54, 55; 292/183, 238

[56] References Cited

U.S. PATENT DOCUMENTS

| | | | |
|---|---|---|---|
| 2,277,939 | 3/1942 | Thalhammer | 248/193 |
| 3,219,362 | 11/1965 | Epstein | 280/150.5 |
| 3,244,301 | 4/1966 | Vaughan | 124/138 |
| 3,495,727 | 2/1970 | Long | 214/138 |
| 3,642,242 | 2/1972 | Danekas | 248/354 R |
| 3,721,458 | 3/1973 | Mitchell | 280/150.5 |
| 3,897,079 | 7/1975 | MacKenzie et al. | 280/150.5 |
| 3,913,942 | 10/1975 | MacKenzie et al. | 280/150.5 |
| 3,930,668 | 1/1976 | Schuermann et al. | 280/150.5 |
| 4,023,828 | 5/1977 | MacKenzie et al. | 280/763 |
| 4,039,206 | 8/1977 | Nault | 280/763 |
| 4,546,996 | 10/1985 | Hanson | 280/764.1 |
| 4,761,021 | 8/1988 | Lagsdin | 280/764.1 |
| 4,889,362 | 12/1989 | Lagsdin | 280/763.1 |
| 5,050,904 | 9/1991 | Lagsdin | 280/764.1 |
| 5,051,057 | 9/1991 | Kremer | 414/685 |
| 5,054,812 | 10/1991 | Lagsdin | 280/764.1 |

FOREIGN PATENT DOCUMENTS

| | | | |
|---|---|---|---|
| 492912 | 5/1953 | Canada. | |
| 1029715 | 4/1978 | Canada. | |
| 1036148 | 8/1978 | Canada | E02F 9/00 |

*Primary Examiner*—Josie Ballato
*Attorney, Agent, or Firm*—Wolf, Greenfield & Sacks, P.C.

[57] ABSTRACT

A reversible stabilizer pad for use with stabilizer arms of vehicles. The reversible stabilizer pad has a plate with first and second ground contact faces pivotally coupled to the stabilizer arm such that the plate can rotate about the arm to engage the ground surface with either ground contact face. A spring member is provided such that it provides a spring tension that resists rotation of the pad in at least a first direction to prevent the pad from rotating from one contact face to the other contact face due to the inertia of the pad as the stabilizer arm is moved. The spring member also indexes the rotational position of the pad with respect to the arm so that at least one of the contact faces evenly engages a ground surface as the arm is emplaced. In other embodiments, a resilient latch, coupled to one of the stabilizer pad and the arm, contacts the other of the stabilizer pad and the arm, and provides frictional resistance to rotation.

37 Claims, 19 Drawing Sheets

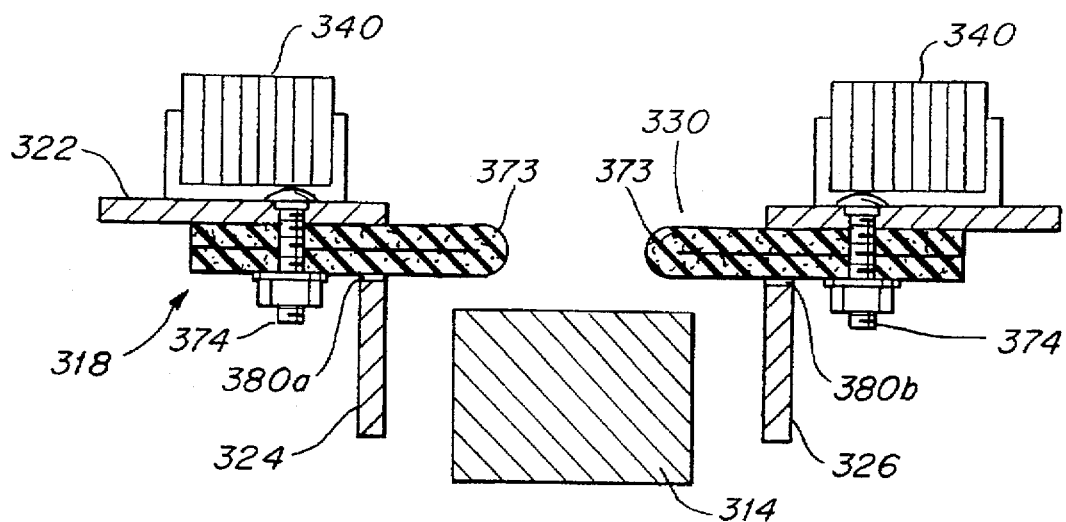
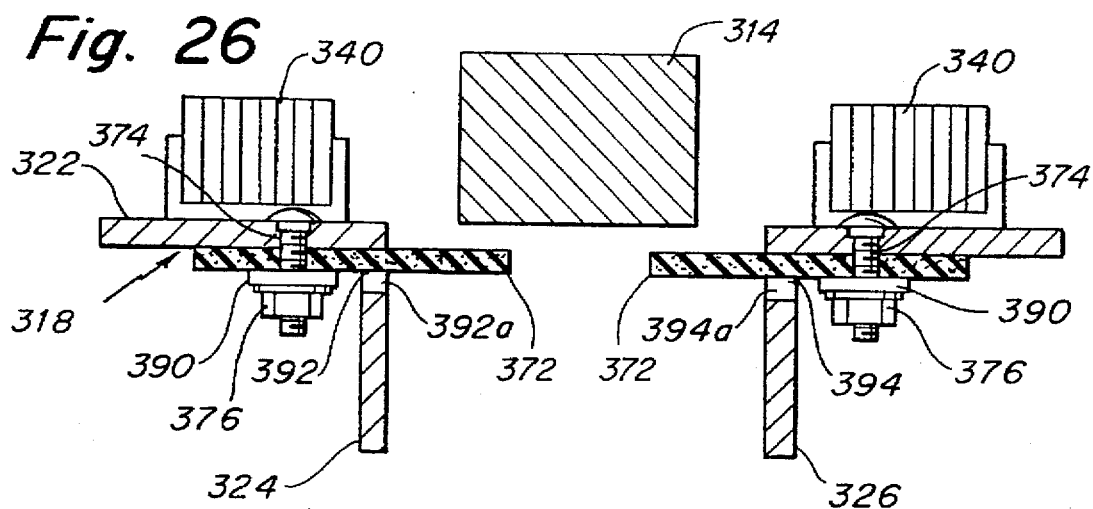
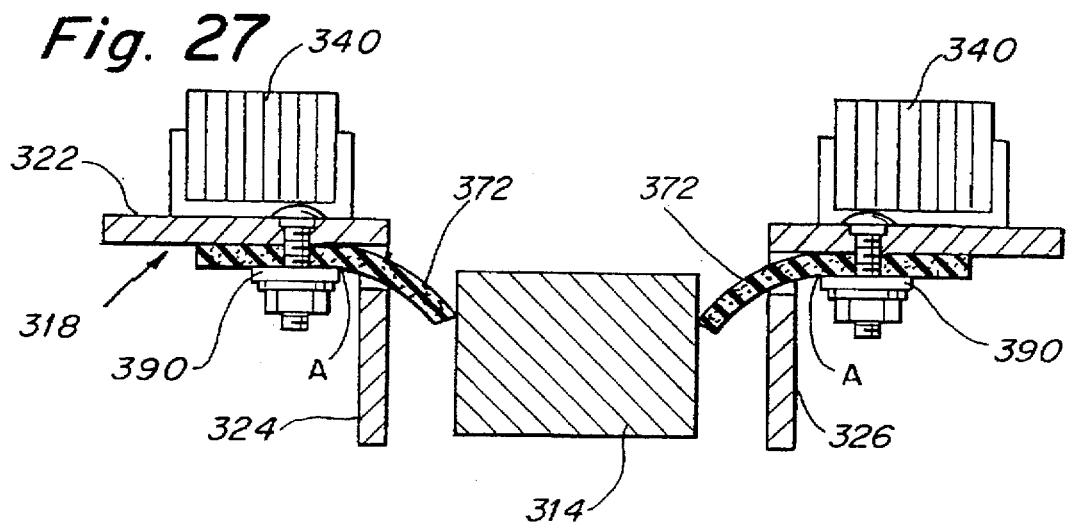

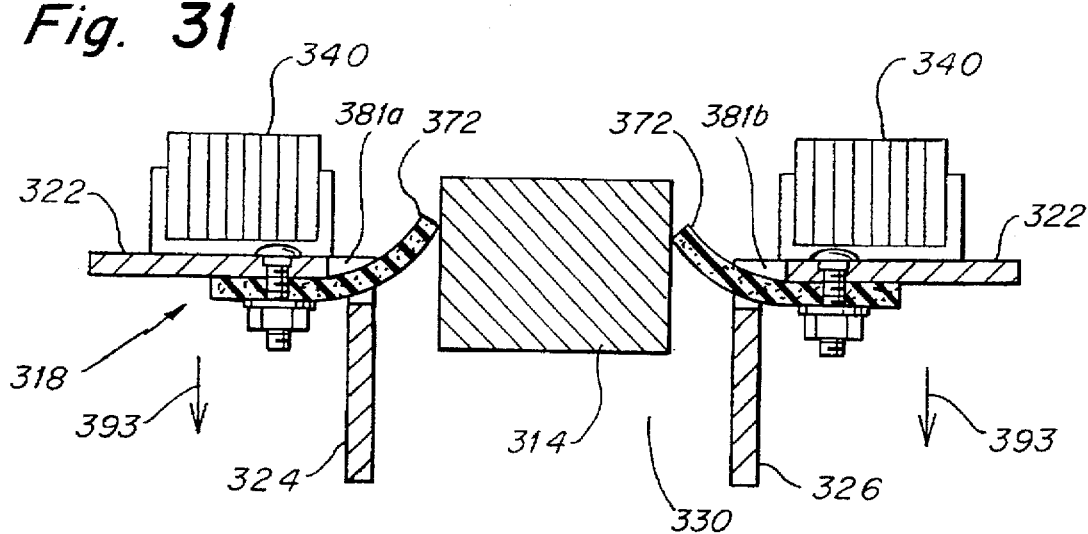
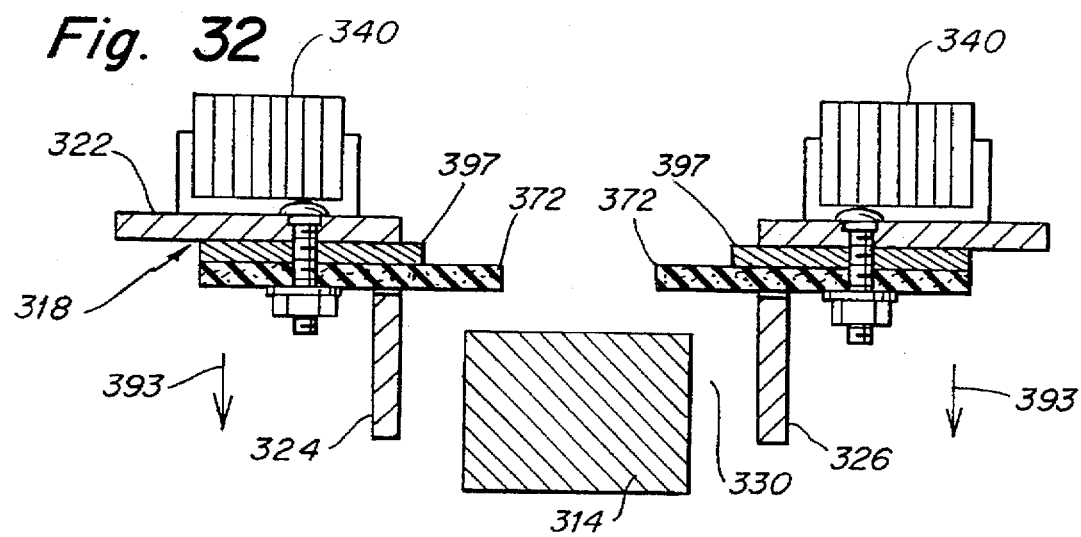
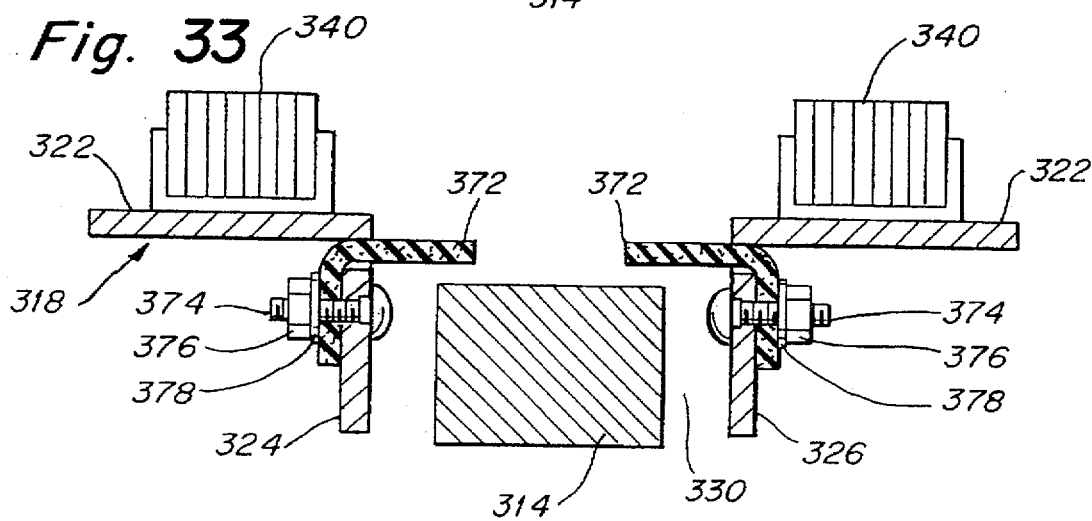

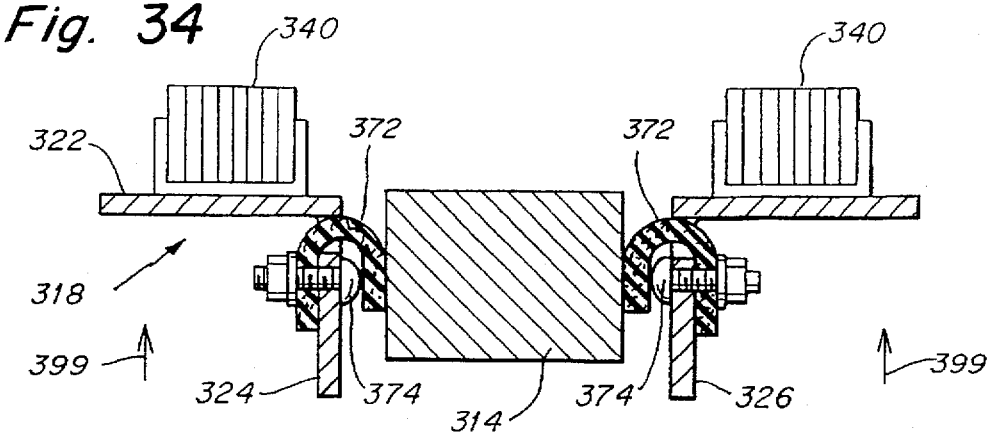
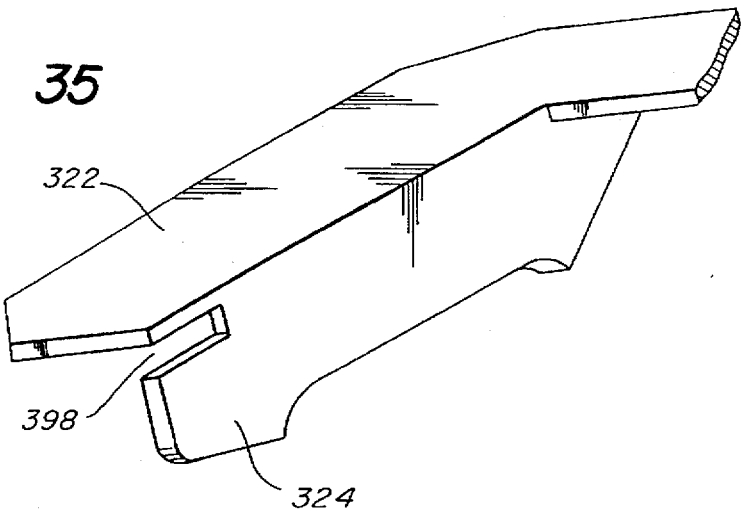
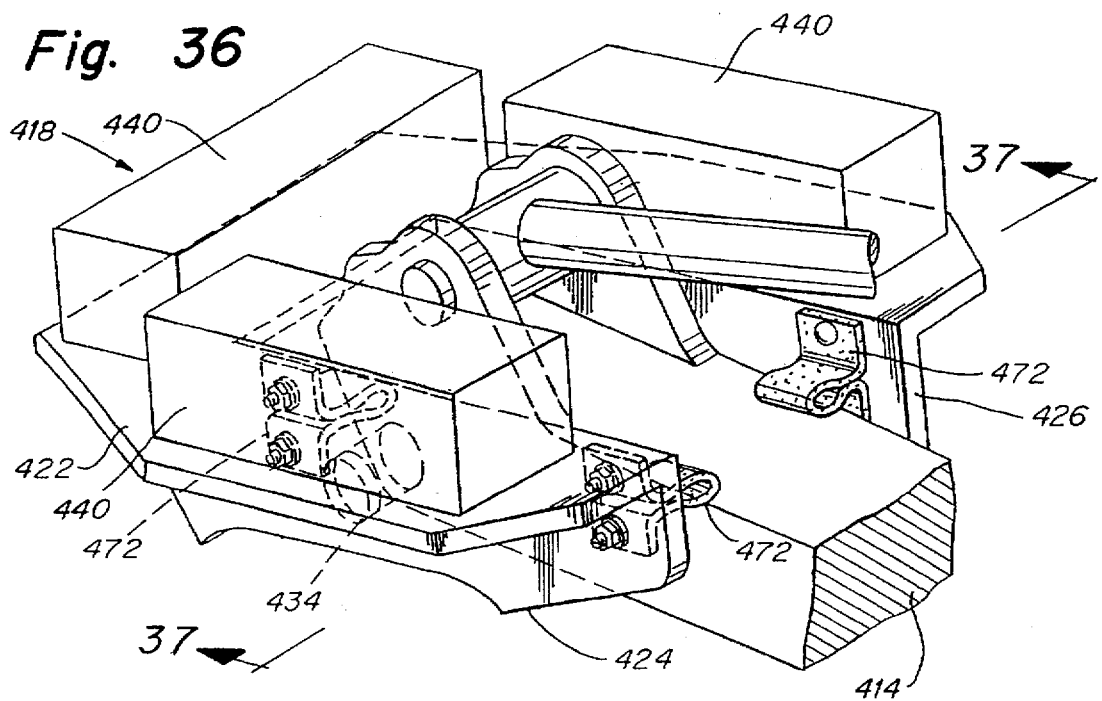

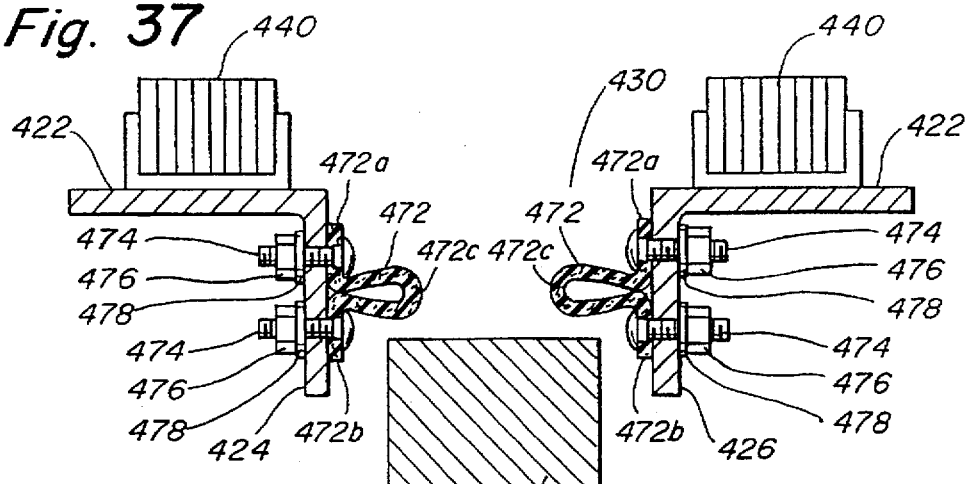
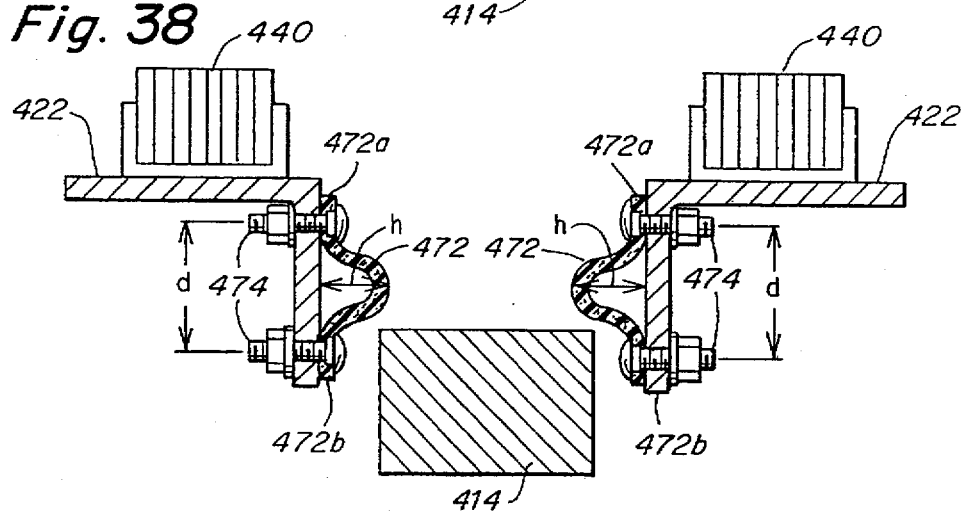
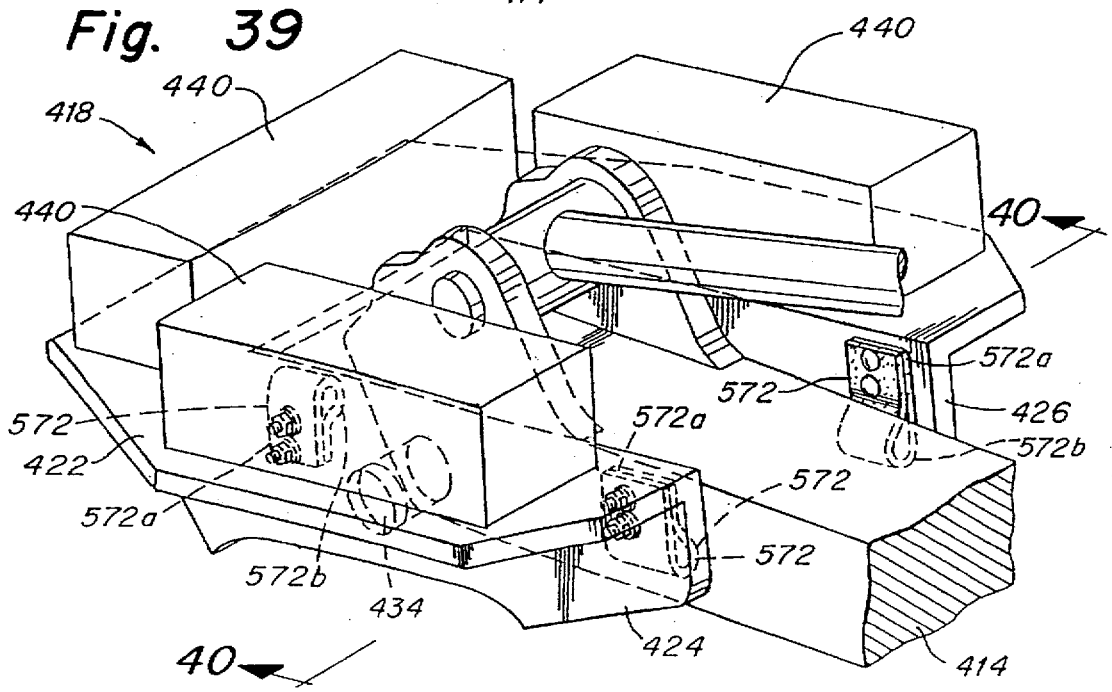

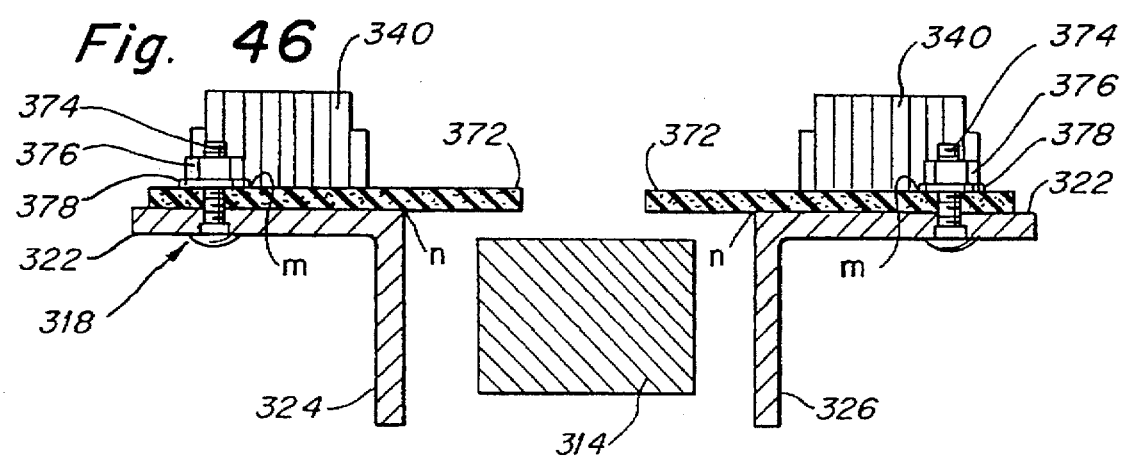

STABILIZER PAD FOR VEHICLES

This application is a continuation-in-part of application Ser. No. 08/398,866, now U.S. Pat. No. 5,547,220, filed Mar. 6, 1995 which is a continuation-in-part of application Ser. No. 08/283,247, U.S. Pat. No. 5,466,004.

FIELD OF THE INVENTION

The invention relates to stabilizer pads for vehicles. More particular, the invention pertains to an apparatus for preventing a pivotally mounted, two-way stabilizer pad from reversing its orientation under its own weight. Other external factors, such as debris that would accumulate on the top side of the pad when the pad is engaged with the ground, could also cause unintended self reversal.

BACKGROUND OF THE INVENTION

U.S. Pat. No. 4,889,362 discloses a reversible stabilizer pad for earth moving vehicles having a generally flanged first surface for engagement with gravel and soft earth, for example, and a resilient surface for engagement with concrete or asphalt. This patent describes the use of rubber pads on one side of the stabilizer pad for ground contact when the vehicle is on a finished surface, such as concrete or asphalt, and flanges with grouser points on the opposite side of the stabilizer pad for ground contact when the machine is on an unfinished but hard ground surface that requires that the pads dig into the surface in order to better anchor and stabilize the machine when encountering difficult digging conditions. The flanged side of the pad is unsuitable for contact with the finished surfaces since it could damage and/or mar such surfaces. The stabilizer pad is pivotally mounted to the end of an hydraulically operated arm such that the pad may be rotated to contact the ground with either the rubber pad side or the flange side facing down to contact the ground surface.

When the vehicle is moved into position, if extra stability is needed, the stabilizer arms, on which the pads are mounted, are hydraulically operated to move from a retracted position, in which the arms generally extend upwardly and out of the way, to a use position, in which the arms extend downward at an angle with the pads contacting the ground surface. The arms and pads, of course, are positioned to provide extra stability to the vehicle. When the vehicle is to be moved, the arms are lifted back to the retracted position, the vehicle is moved to a new operating location and the stabilizer arms are brought down into the use position again, if necessary.

In prior stabilizer pad constructions such as the one described in U.S. Pat. No. 4,889,362, there has been a tendency for the pad to self-flip when the earth moving machine pad support arm is lifted. The self-flipping problem relates primarily to flipping from flanged side down to rubber pad side down because the rubber pad side is typically much heavier than the flange side. When the pad inadvertently flips sides, an operator must manually flip the pad back so that the proper side is facing down. Frequently, however, the operator does not realize that the pad has self-flipped or, even if he/she realizes it, does not bother to fix it.

Accordingly, the machine is used with the wrong side of the stabilizer pad in contact with the ground surface, which could result in increased hazard as well as increased wear of the rubber pads, leading to premature need for replacement. The self-flipping of the pad can be remedied with a securing or engaging bolt that is required to be secured in each position of the pad and to be disassembled and re-secured when the position of the pad is to be changed. This becomes time consuming and furthermore may involve parts that are easily lost. Further, the operator simply may not use the securing pin or bolt.

U.S. Pat. No. 4,889,362 discloses an automatically operatable latch that is adapted to rotate into an engagement with the pad when the pad is in a ground engaging surface, and furthermore adapted to automatically rotate by gravitational force out of engagement with the pad when the arm of the earth moving machine that supports the pad is lifted. In this way, when the support arm is lifted, the latch disengages from the pad and the pad is easily rotated to its opposite position. It has been found, however, that rocks, gravel and other debris frequently get caught in the automatic latch disclosed in U.S. Pat. No. 4,889,362 which can prevent the latch from releasing when the arm is lifted. In many stabilizer constructions, however, the pad must rotate to some extent when the arm is lifted in order to allow the piston of the arm to retract into the cylinder. Failure of the latch to release can thus result in damage to the arm or pad.

In prior art stabilizer pad constructions, there is also a tendency for the pad, when configured with the rubber pad side down, to engage the ground surface with the rubber surface at an angle to the ground rather than horizontal to the ground as desired. As shown in FIG. 19, when the rubber pad engages the ground surface at an angle, it results in uneven wear of the rubber pad and causes the operator of the vehicle to be jolted as the pad engages the ground surface.

It is an object of the present invention to provide an improved stabilizer pad/arm construction for a vehicle.

It is a further object of the present invention to provide a stabilizer pad/arm construction for an earth moving machine which will not flip sides unintentionally.

It is another object of the present invention to provide a self-flip prevention mechanism which can be easily added to virtually any stabilizer pad/arm construction.

It is another object of the present invention to provide a stabilizer pad/arm construction for an earth moving machine which will not jam.

It is yet another object of the invention to provide a stabilizer pad/arm construction for a vehicle which will index the pad with respect to the arm to allow the pad to make smooth contact with the ground surface.

SUMMARY OF THE INVENTION

The invention is a stabilizer pad/arm construction for use with vehicles such as earth moving equipment or other construction vehicles. The stabilizer pad is coupled to the stabilizer arm so as to be pivotable about an axis of rotation. The stabilizer pad has a plate having first and second faces adapted to provide optimal contact patches with the ground, one side being particularly adapted for contacting soft earth or gravel and the other side particularly adapted for contacting asphalt, concrete or another hard surface. The stabilizer pad is rotatable about the pivot in order to be able to contact the ground with either side facing the ground.

In order to prevent the pad from accidentally rotating under its own weight so as to switch ground contact sides when the arm is lifted, the pad in one embodiment is coupled to the arm such that, in order for the pad to flip sides, the arm must pass through a channel defined by side walls of the pad. A steel plate is coupled transversely to the arm to define two small gaps between the side walls and the edges of the steel plate. A rubber strip, slightly longer than the steel plate and the channel, is sandwiched between the arm and the steel plate. When the pad is rotated to a predetermined position relative to the arm, the rubber strip contacts the side walls of the pad. The thickness of the pad is greater than the width of the gaps between the edge of the steel plate and the side walls. Accordingly, when the pad is rotated in a direction such that the pad enters the gap before the steel plate, the edges of the strip which extend beyond the edges of the plate bend upward and get trapped or jammed in the gap between the edge of the plate and the side wall. Since the strip is thicker than the gap, it is compressed and provides a high frictional resistance to further rotation of the pad relative to the arm in that direction. The frictional resistance is a function of the thickness of the pad relative to the thickness of the gap and the frictional coefficient of the surface of the pad and the side walls. The frictional resistance is selected such that the weight of the pad is insufficient to overcome the frictional resistance to further rotation, but small enough to allow the friction to be overcome with additional manual pressure when it is desired to flip the pad over.

Alternately or additionally, the strip may be resilient but relatively stiff so as to resist the bending necessary for the strip to fold inwardly on itself and fit through the gaps.

In another embodiment of the invention, at least one spring rod is connected to one of the support arm and the pad and an associated cam is connected to the other of the support arm and the pad near the pivot point of the pad with the arm. A first end of the spring rod is firmly secured to the support arm or to the pad, and a second end of the spring rod, located near the pivot point of the pad, is free to bend. During the rotation of the pad, the cam contacts the spring rod near the second end of the spring rod, and the spring rod must be forced to bend in order for the pad to flip sides. The spring rod is selected such that the inertia created by the weight of the pad is insufficient to overcome the spring force necessary to cause the spring rod to sufficiently bend to allow the cam and the pad to rotate. However, the spring force can be overcome with additional manual pressure when it is desired to flip the pad over. The cam and the spring rod are positioned such that the spring arm biases or indexes the cam to position the pad in a predetermined rotational position with respect to the stabilizer arm as the pad is lowered to the ground to allow the pad to evenly contact a flat surface.

In yet another embodiment of the present invention, a resilient strip has a first end fixed to the stabilizer pad and a second end within a notch of the stabilizer pad such that the second end contacts the stabilizer arm as the stabilizer pad rotates with respect to the stabilizer arm to provide a resistance to rotation of the stabilizer pad with respect to the arm.

In still another embodiment of the present invention, a resilient strip has first and second ends fixed to a stabilizer pad such that a middle section of the resilient strip is located within a notch of the stabilizer pad. The middle section of the resilient strip contacts the stabilizer arm as the arm rotates with respect to the pad to provide resistance to rotation of the arm with respect to the pad.

BRIEF DESCRIPTION OF THE DRAWINGS

FIG. 25 is a cross-sectional end view, similar to FIG. 21, showing a sixth alternate embodiment of the present invention.

FIG. 26 is a cross-sectional end view, similar to FIG. 21, showing a seventh embodiment of the present invention with the arm and pad in a first relative rotational position.

FIG. 27 is a cross sectional end view similar to FIG. 21 of the seventh embodiment of the present invention in a second relative rotational position.

FIG. 31 is a cross-sectional end view similar to FIG. 21 with the stabilizer pad in a second relative rotational position.

FIG. 32 is a cross-sectional end view, similar to FIG. 21, in which steel plates are added to the embodiment of the present invention shown in FIG. 21.

FIG. 33 is a cross-sectional end view, similar to FIG. 21, of a ninth alternate embodiment of the present invention in a first relative rotational position.

FIG. 34 is a cross-sectional end view similar to FIG. 33 of a second relative rotational position of the ninth embodiment of the present invention.

FIG. 35 is a fragmentary perspective view, similar to FIG. 29, showing an alternate configuration of a slot in flanges of a stabilizer pad used in embodiments of the present invention.

FIG. 36 is a perspective view of a tenth alternate embodiment of the present invention.

FIG. 37 is a cross-sectional end view of the embodiment of the invention shown in FIG. 36 taken along line 37—37 of FIG. 36.

FIG. 38 is a cross-sectional end view, similar to FIG. 37, of an eleventh alternate embodiment of the present invention.

FIG. 39 is a perspective view of a twelfth alternate embodiment of the present invention.

FIG. 46 is a cross-sectional end view, similar to FIG. 21, of a fourteenth embodiment of the present invention.

DETAILED DESCRIPTION OF THE INVENTION

Figure 1:
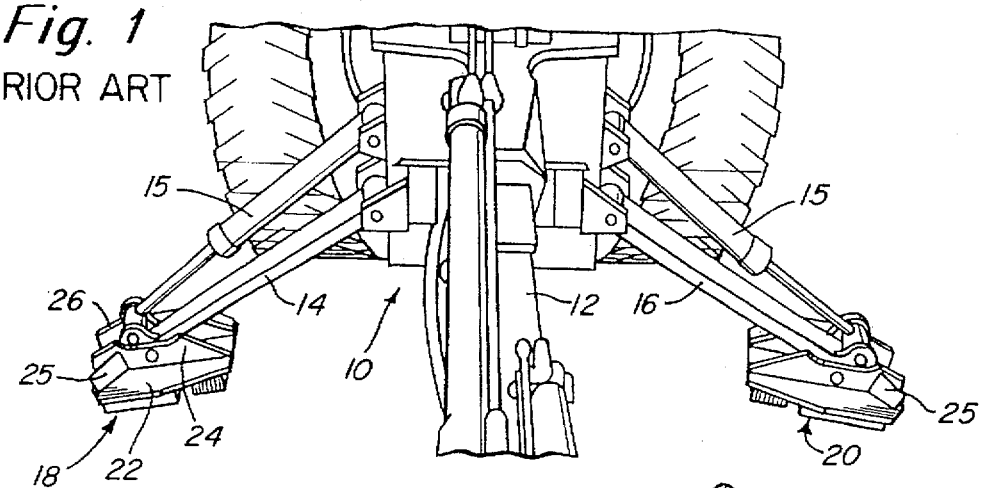
FIG. 1 is a fragmentary view of a typical loader/backhoe having stabilizer pads of the prior art secured thereto.

FIG. 1 is a fragmentary view of a typical loader/backhoe 10 having a shovel mechanism 12, stabilizer arms 14 and 16, and associated stabilizer pads 18 and 20, respectively. Hydraulic piston 15 may operate each of the stabilizer arms 14 and 16 independently. When the equipment is being moved, the pistons associated with each cylinder are withdrawn so that the support arms pivot and are thus elevated above ground level. As the arms are pivoted upwardly, it is in that position that the pads may then be reversed. When the support arms are to be used, the piston associated with each of the cylinders are extended to the position shown in FIG. 1 for ground engagement.

Figure 2:
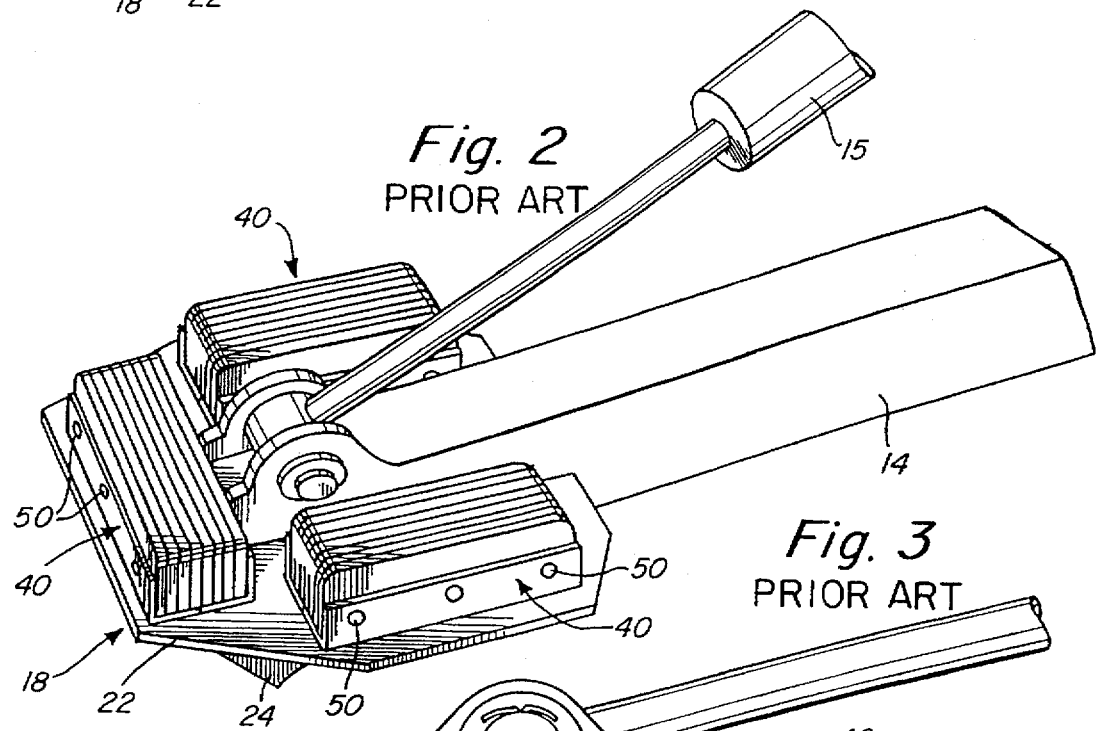
FIG. 2 is a perspective view of the stabilizer pad and arm of FIG. 1 in a gravel or dirt engaging position.
Figure 3:
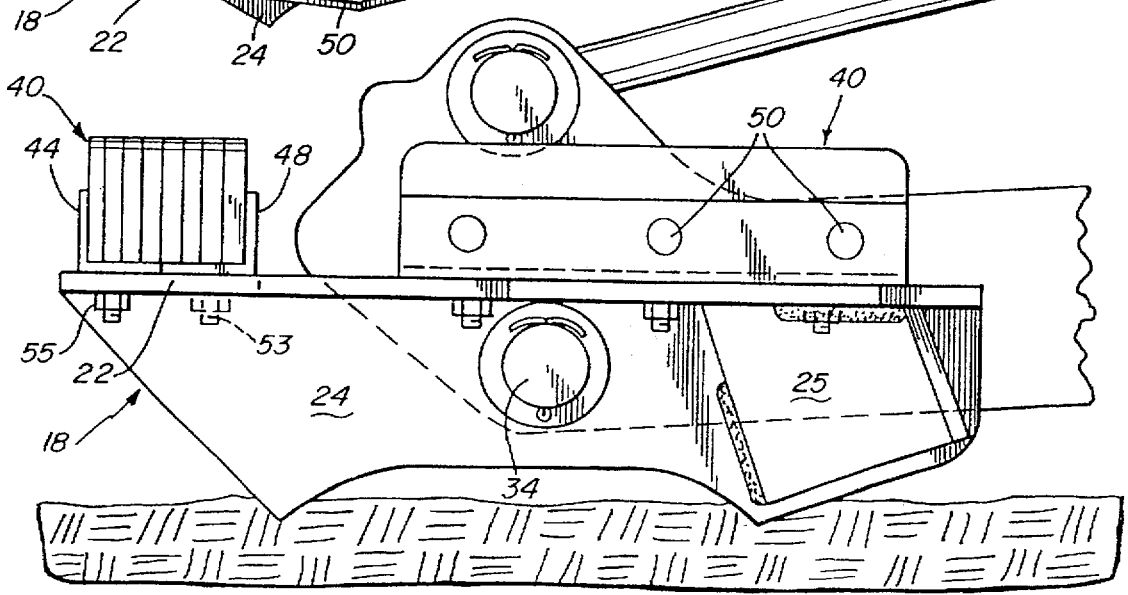
FIG. 3 is a side elevational view of the stabilizer pad and arm construction in the position of FIG. 2.
Figure 4:
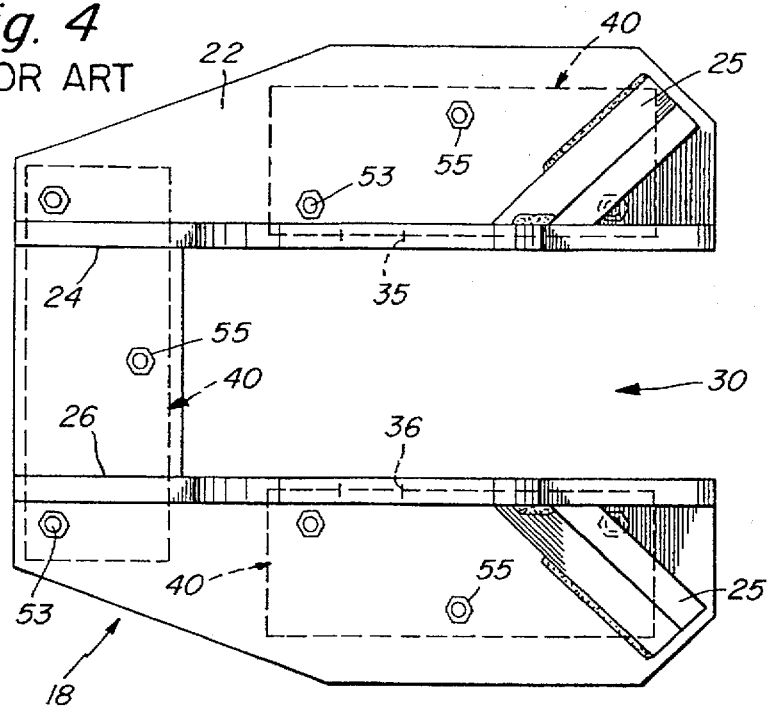
FIG. 4 is a bottom plan view of a stabilizer pad of FIGS. 1-3 shown uncoupled from a stabilizer arm.

With reference to FIGS. 2 and 3, the stabilizer pad 18 generally includes a flat plate 22 that has extending normal to the surface thereof the flanges 24 and 26, both extending on one side from the surface of plate 22. The stabilizer pad is also provided with supporting webs or ribs 25, one associated with each flange. These provide additional support for the flanges 24 and 26. The plate 22 is notched at 30 between flanges 24 and 26 such as illustrated in FIG. 4. The plate is notched so as to accommodate the arm 14 and to enable the reversible rotation of the stabilizer pad. The arm 14 includes a journal end for accommodating pin 34. Pin 34 also fits within holes 35 and 36 of flanges 24 and 26, respectively. The pin 34 may be secured in place by means of a typical cotter pin as illustrated in FIG. 3, or the pin 34 may be threaded to accommodate a nut. FIG. 2 most clearly illustrates the resilient side of the pad is in the form of three laminated pads 40.

The drawings illustrate the basic components comprising the stabilizer member resilient pad structure. This includes the angle irons 44 and 48. Both angle irons include a base leg and an upright leg. Each of the upright legs has holes therein for receiving the elongated securing pins 50. The laminated pads are secured to the plate 22 by means of a series of bolts 53 each having associated nuts 55.

Figure 5:
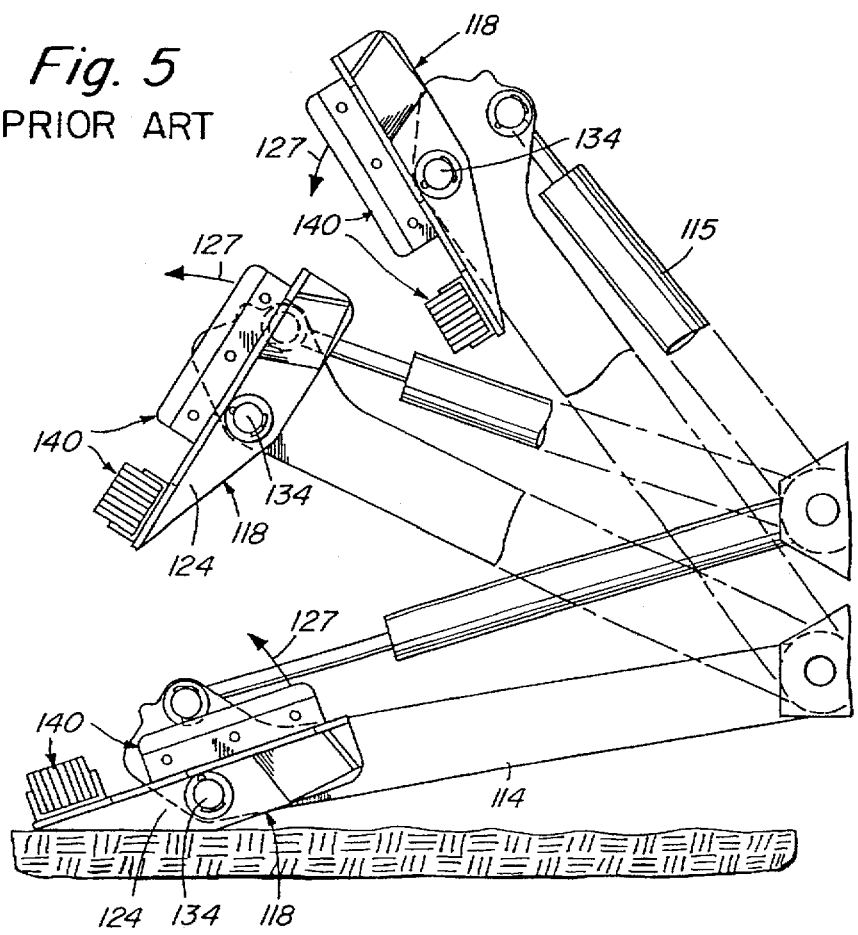
FIG. 5 is a sequential diagram illustrating the prior art problem of the stabilizer pad self-flipping.

FIG. 5 illustrates a sequence of events as a support arm 114 is lifted. In the bottom position, the pad 118 is illustrated with the flanges 124 in contact with the ground surface. In the top position is it noted that the pad has now self-flipped so that the resilient side of the pad with the laminated pads 140 is facing substantially downward. The support arm 114 may be lifted in a rather jerky motion. Because of certain inertia, the pad is apt to rotate about the pin 134 to flip on its own. This is undesirable because, typically at a construction or other site at which earth moving equipment is being used, the ground surface is relatively consistent, either being soft, so that one desires the laminated side to be facing down. At such a site, the earth moving equipment typically is moved many times, requiring stabilizer arms to be retracted upwardly so that the earth moving machine can be moved and the stabilizer arms to be put down again with the same side facing down. Only when the ground surface changes, a relatively rare occurrence, it is desired that the stabilizer pad flip over.

Although the pad does not tend to self-flip from the rubber side to the flanged side, because the rubber side of the pad is considerably heavier than the flanged side, the pad does tend to self-flip from the flanged side to the rubber pad side.

In the sequence of FIG. 5, which should be viewed from the bottom up, the pad 118 is shown engaging the ground surface at the bottom of the figure. As the arm 114 is raised by the hydraulic piston 115, there is an inertia force in the direction of arrow 127. This same inertia force is also illustrated in the middle position illustrated in FIG. 5 wherein the pad is illustrated as now having been half-flipped upon a raising of the support arm 114. The top position in FIG. 5 illustrates the pad now completely reversed. When the arm 114 is now lowered again, the wrong surface will be facing downward and will engage the ground since the pad has self-flipped.

The present invention provides a stabilizer pad/arm construction which eliminates the self-flipping problem. Further, virtually any other stabilizer pad/arm construction can be easily and inexpensively modified to the construction of the present invention to eliminate the problem of self-flipping.

Figure 6:
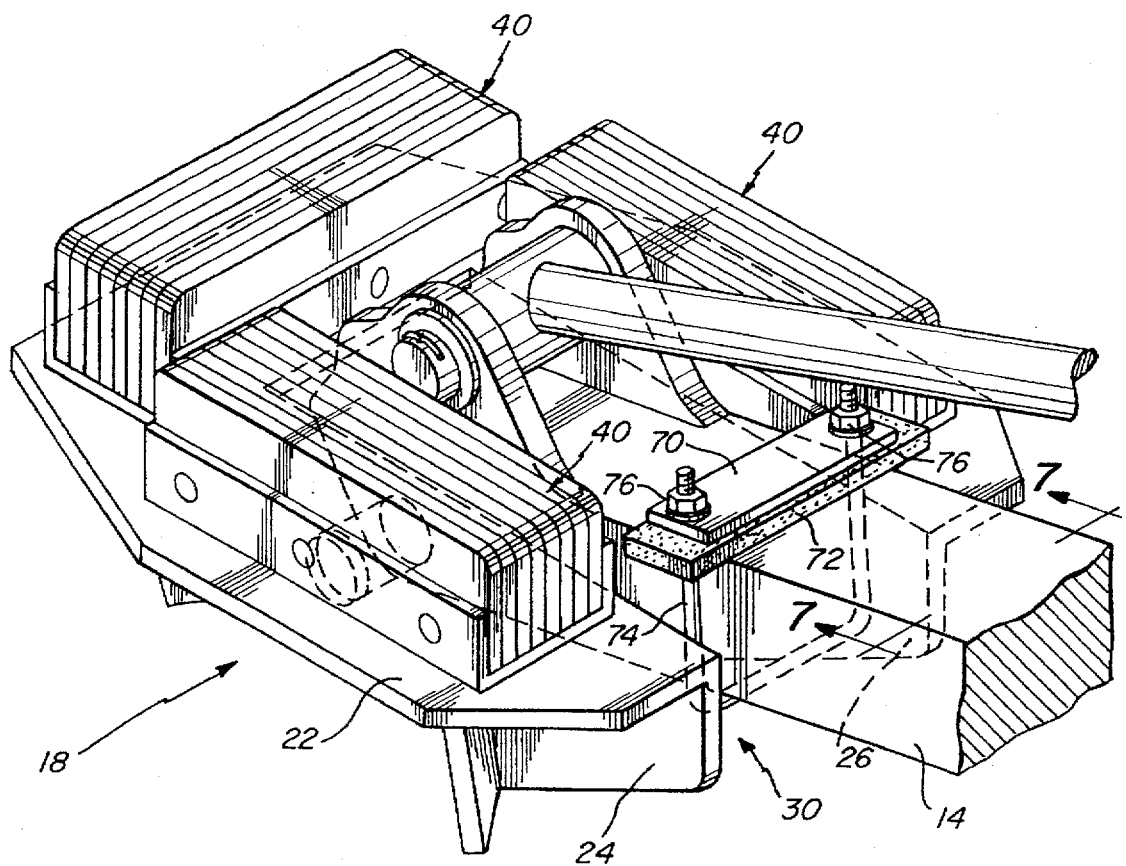
FIG. 6 is a fragmentary view of the stabilizer pad of the present invention coupled to a stabilizer arm.
Figure 7:
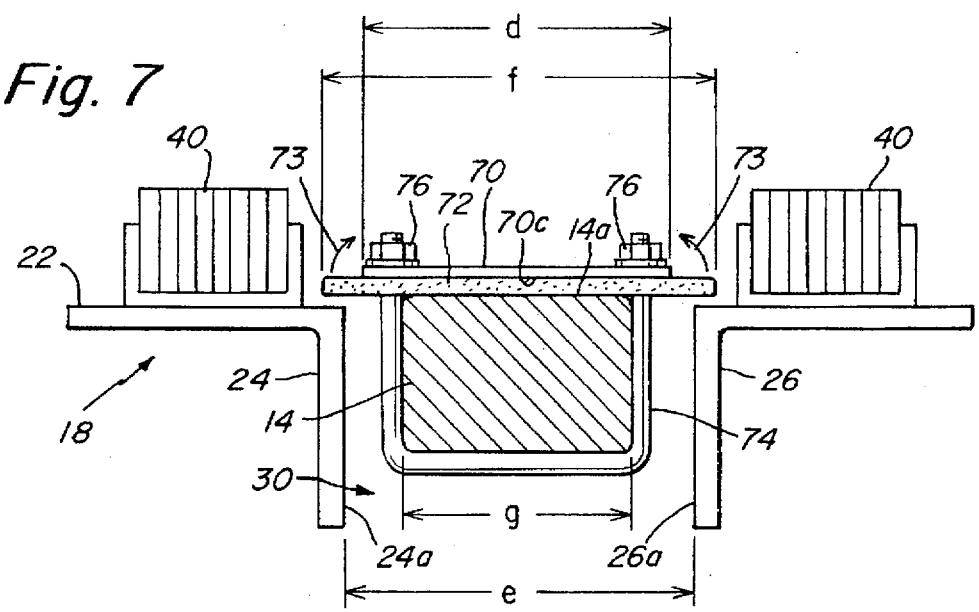
FIG. 7 is a schematic cross-sectional end view taken along line 7 of FIG. 6 showing the pad in a gravel contacting position.
Figure 8:
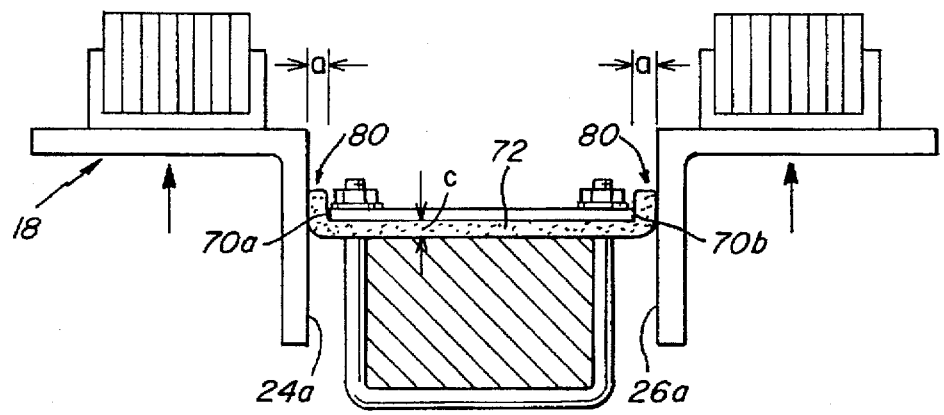
FIG. 8 is a schematic cross-sectional end view, similar to FIG. 7, showing the arm and pad in a second relative rotational position.
Figure 9:
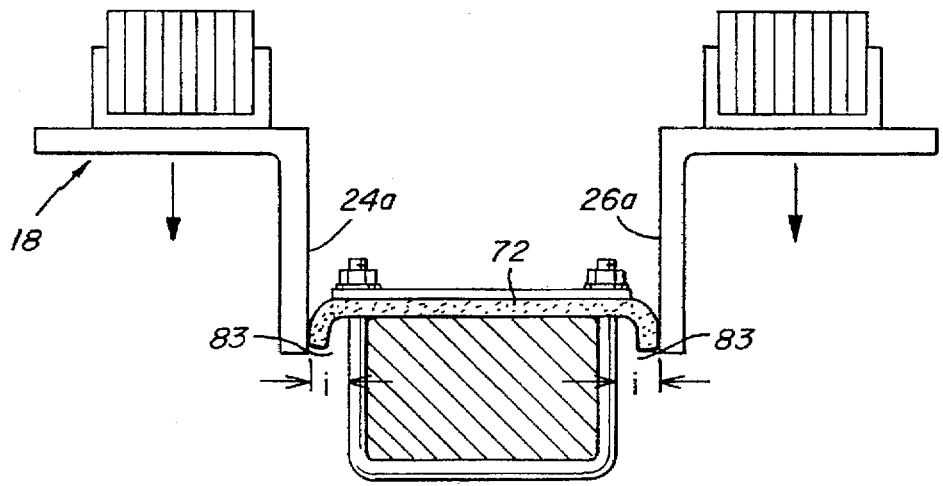
FIG. 9 is a schematic cross-sectional end view, similar to FIG. 7, showing the arm and pad in a third relative rotational position.

A preferred embodiment of the invention will now be described in detail with reference to FIGS. 6–9. The pad 18 comprises a steel plate 22 which is adapted to contact the ground with either side of the plate facing downwards. In FIG. 6, the side having flanges 24 for contact with soft earth is facing downward and the side bearing rubber pads 40 is facing upward. The stabilizer arm 14 extends in channel 30 (best seen in FIGS. 7, 8 and 9) and is pivotally coupled to the pad 18 in the manner best illustrated by FIG. 3 and discussed above. A steel plate 70 and a high friction, resilient strip 72 are fixed to the arm by a partially threaded U bolt 74. As best seen in FIGS. 7–9, the U bolt 74 surrounds the arm 14 and engages holes through the plate 70. Threaded nuts 76 engage the threaded ends of the U bolts to secure the plate to the U bolt around the arm. The strip 72 is sandwiched between upper surface 14a of the arm 14 and the lower surface 70c of the plate 70. The strip is formed of rubber or another flexible, abrasion resistant, material, such as spring tempered metal or neoprene. Preferably, the material also has a relatively high coefficient of friction, e.g., rubber or neoprene. The steel plate 70 is of a length, d, which is greater than the width, g, of the arm yet smaller than the width, e, of the channel 30. The rubber strip 72 is of a length, f, greater than the width, e, of the channel such that, when the arm is rotated into the channel the rubber strip 72 does not fit through the channel with the rubber strip 72 in its fully extended horizontal position, as best seen in FIG. 7. Since the length, d, of the plate 70 is less than the width, e, of the channel, small gaps 80 of width a (see FIG. 8) exist between the edges 70a and 70b of the steel plate 70 and the side walls 24a and 26a of the channel 30. The thickness, c, of the rubber strip 72 is greater than the width, a, of gaps 80. The strip 72 is preferably rubber such that it has a surface of relatively high friction, is compressible, in the direction of its thickness, c, and can be flexed under force in the direction of the arrows 73 in FIG. 7.

Figure 6A:
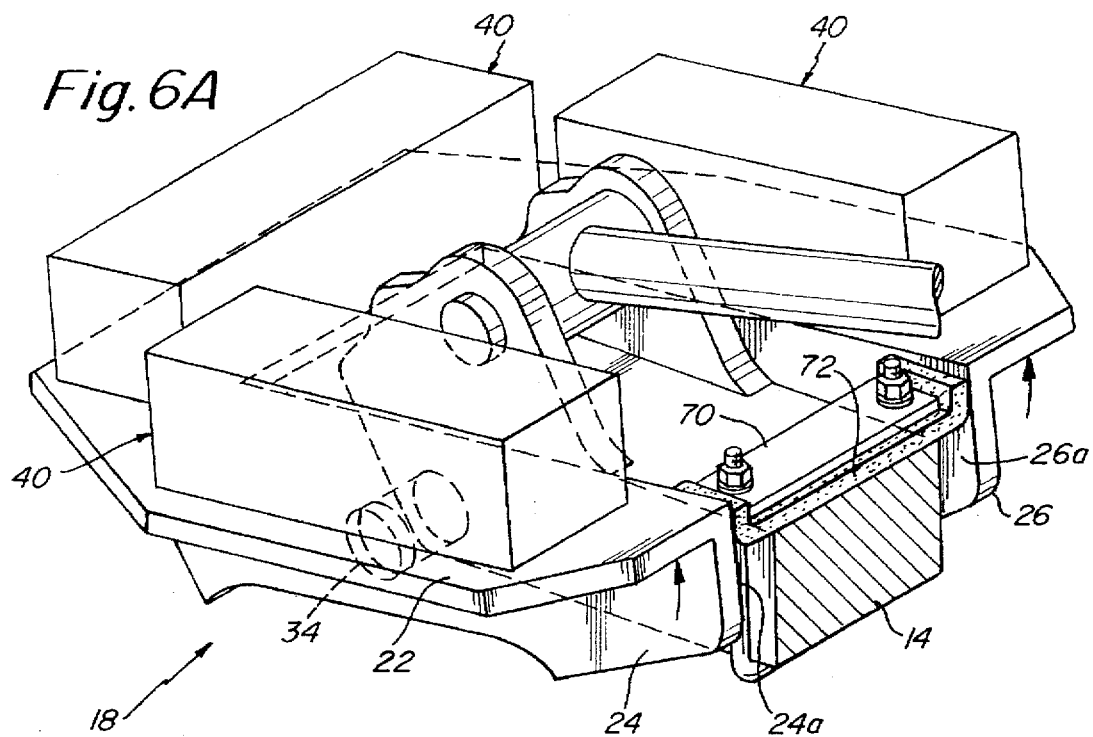
FIG. 6A is a fragmentary view similar to FIG. 6 showing the arm and pad in a second relative rotational position.

When the arm and pad are in the relative rotational relationship shown in FIGS. 6 & 7, the pad can be forced to rotate further into the position shown in FIGS. 6A & 8 (rotated counterclockwise in the view of FIG. 6) such that the end portions of the rubber strip 72 which extend beyond the edges 70a and 70b of the plate 70 flex upwardly and become trapped between the side walls 24a and 24b and the edges 70a and 70b of the plate 70, providing a frictional resistance to further rotation in that direction. The particular thickness, c, of the rubber pad 72 and/or its surface coefficient of friction is selected such that the inertia of the pad itself towards self-flipping cannot overcome the frictional resistance, but application of manual pressure to further rotate the pad in the counterclockwise direction can overcome the frictional resistance to rotation in that direction.

Accordingly, someone wishing to flip the pad so that the rubber side faces down can do so easily, but the pad will not be able to self-flip accidentally under solely its own inertia.

Figure 6B:
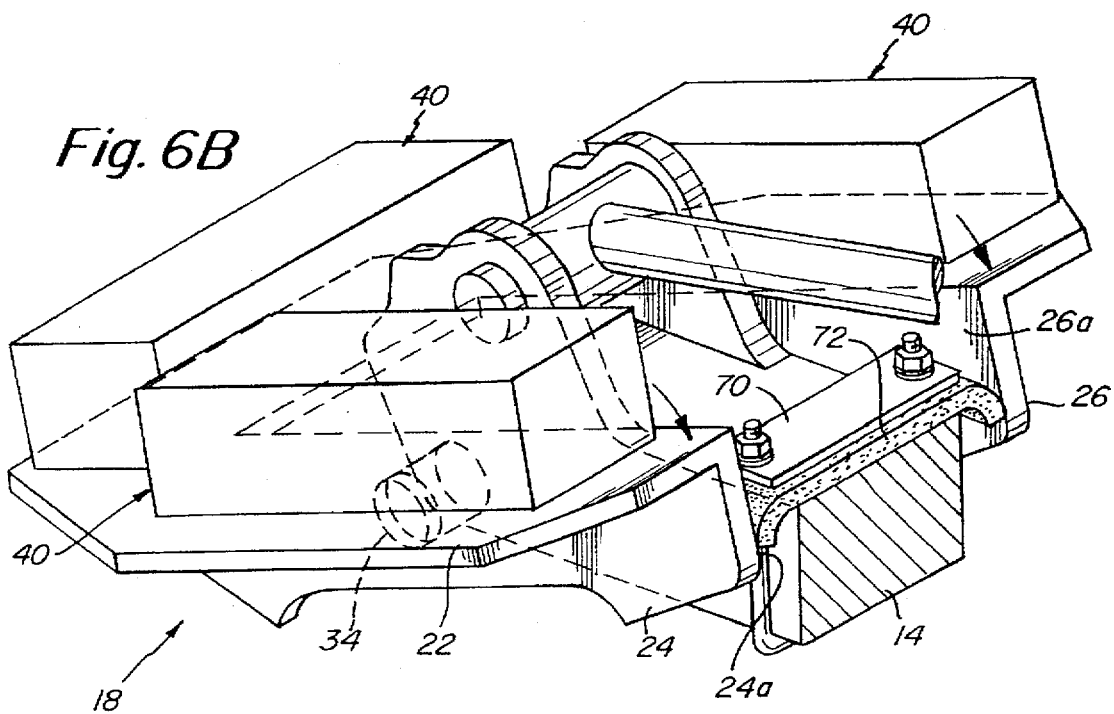
FIG. 6B is a fragmentary view similar to FIG. 6 showing the arm and pad in a third relative rotational position.

Typically, stabilizer pads are likely to self-rotate only from flange side down to rubber side down, and not vice versa, because the rubber side typically is much heavier than the flanged side. Accordingly, it is preferable that there is substantially less or even no resistance to rotation of the arm through the channel in the opposite direction (in the clockwise direction in the view shown in FIG. 6). Accordingly, the gap 83 between the edges of the U bolt and the side walls is of a width, i, (see FIGS. 6B & 9) greater than the thickness, c, of the pad 72. Accordingly, there is very little frictional resistance to rotation of the arm through the channel in that direction since the strip 72 is not compressed in the gap 83.

The flexibility of the strip 72, i.e., its resistance to flexing in the direction opposite of arrows 73 in FIG. 7 should be low enough so as not to offer any significant resistance to rotation in a clockwise direction. It should be noted that the length of the strip which is allowed to flex when the arm passes through the channel in the clockwise direction in FIG. 6, i.e., f–g, is much greater than the length of the strip which is allowed to flex when the arm passes through the channel in the counterclockwise direction, i.d., f–e. Thus, more force is required to flex the shorter exposed strip 72 upward in FIGS. 7–8 to fit through the channel 30 than to flex the longer exposed ends vertically downward to fit through the channel because a greater length of the strip is allowed to flex when flexed downward. Accordingly, the resistance to rotation in the clockwise direction is much less than in the counterclockwise direction, not only because of the substantial lack of frictional resistance to clockwise rotation, but also because there is substantially less force required to flex the ends of the strip to fit through the channel 30 when rotating the pad clockwise. Thus, the resistance to rotation in both directions is a function of the coefficient of friction of the strip material, the thickness of the strip material, and the stiffness of the strip material. Any one or more of these properties of the strip material can be used to set the desired force necessary for rotation beyond the contact point in either direction. For instance, if desired, a low friction material can be employed and the resistance to rotation can be primarily a function of flexibility, with friction playing almost no part.

It has been found that rubber strips cut from side wall segments of truck-tire carcasses provide acceptable material in terms of flexibility properties and surface friction properties to serve as rubber strips 72.

Figure 10:
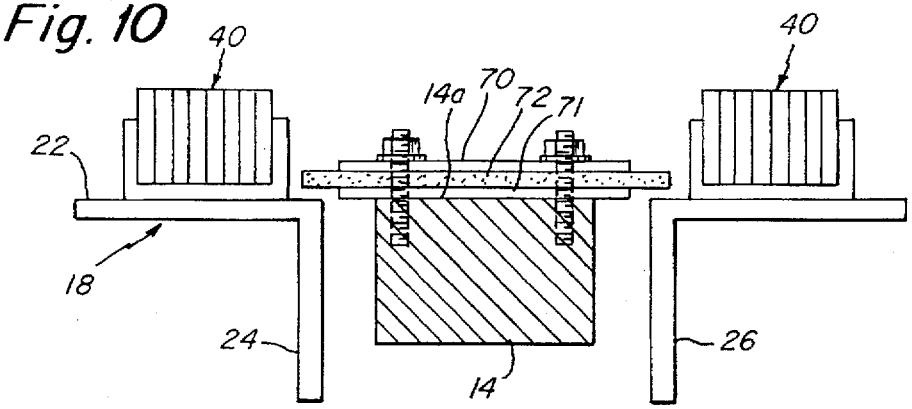
FIG. 10 is a schematic cross-sectional end view, similar to FIG. 7, showing a first alternative embodiment of the present invention.

Of course, if in a particular stabilizer pad/arm combination, it is desirable to better prevent self-flipping in either direction, another steel plate 71 substantially of the same dimension as the top steel plate 70 can be placed between the top surface 14a of the arm 14 and the bottom surface of the rubber strip 72, as shown in FIG. 10, so as to offer the same resistance to rotation of the arm in the channel in both directions. Further the steel plate 70 need not be coupled to the arm by a U bolt surrounding the arm but may simply be bolted to the arm itself such as by providing at least two bolts passing through holes in the plate, the bolts being received in corresponding threaded holes in the arm. Alternately, the strip may be glued to the arm, eliminating the need for a steel plate.

Figure 11:
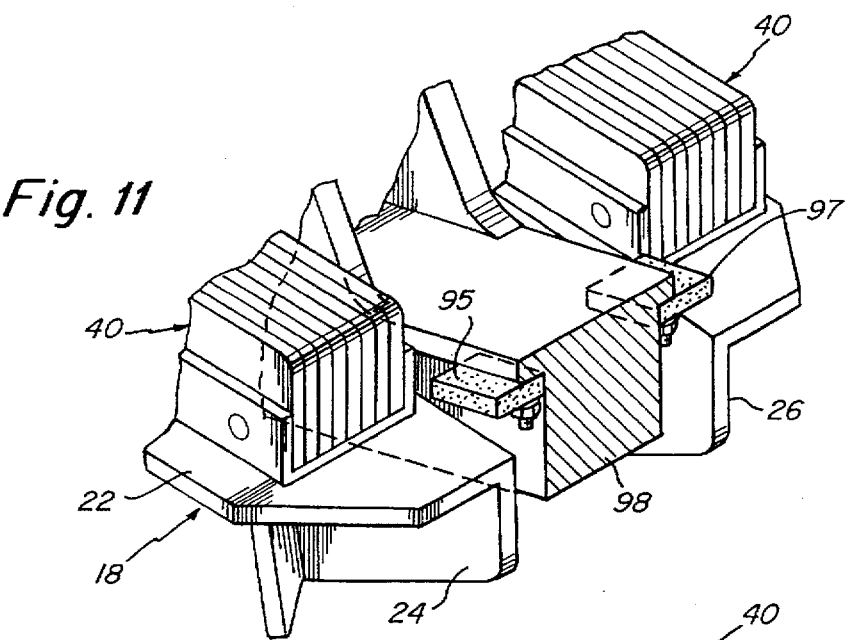
FIG. 11 is a partially cut away perspective view showing a second alternative embodiment of the present invention.

Furthermore, FIG. 11 illustrates still another embodiment of the present invention in a partially cut away perspective view. In FIG. 11, the arm 98 is provided with a stepped cross section, as illustrated. This defines opposed flanges under which is provided two rubber strips 95 and 97. The rubber strips 95 and 97 are glued or otherwise attached to the arm 98. In FIG. 11, the strips 95 and 97 are illustrated being bolted to the opposite sides of the arm 98.

Figure 12:
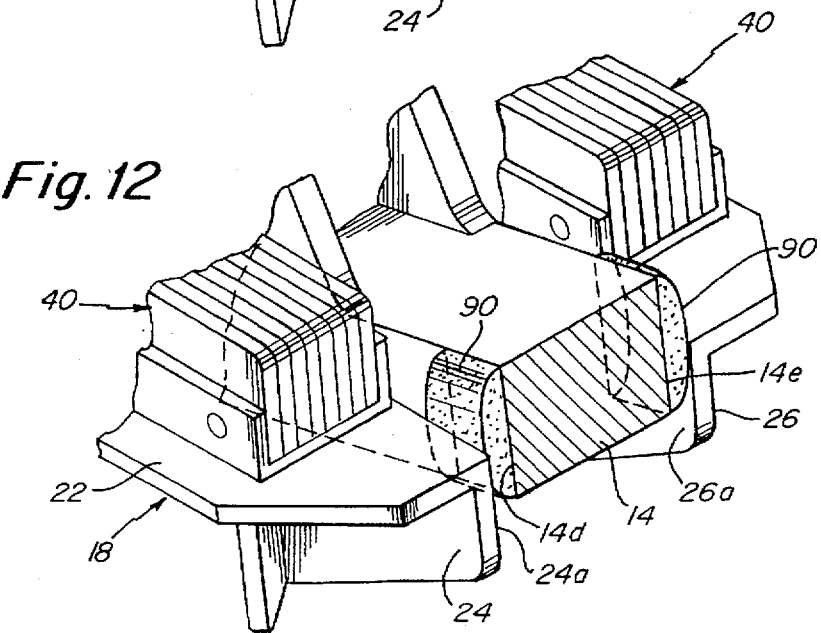
FIG. 12 is a cross-sectional end view, similar to FIG. 7, showing a third alternative embodiment of the present invention.

Reference is now made to the cut away perspective view of FIG. 12 for an illustration of another embodiment of the present invention. In this particular embodiment, resistance to rotation is provided in both directions. For this purpose, there is provided a compressible frictional pad 90 that can be bolted, glued or otherwise fixed to the side surfaces 14d and 14e of the arm 14. This arrangement provides a high friction press fit between the individual pads 90 and the side walls 24a and 26a of the stabilizer pad 18.

Figure 13:
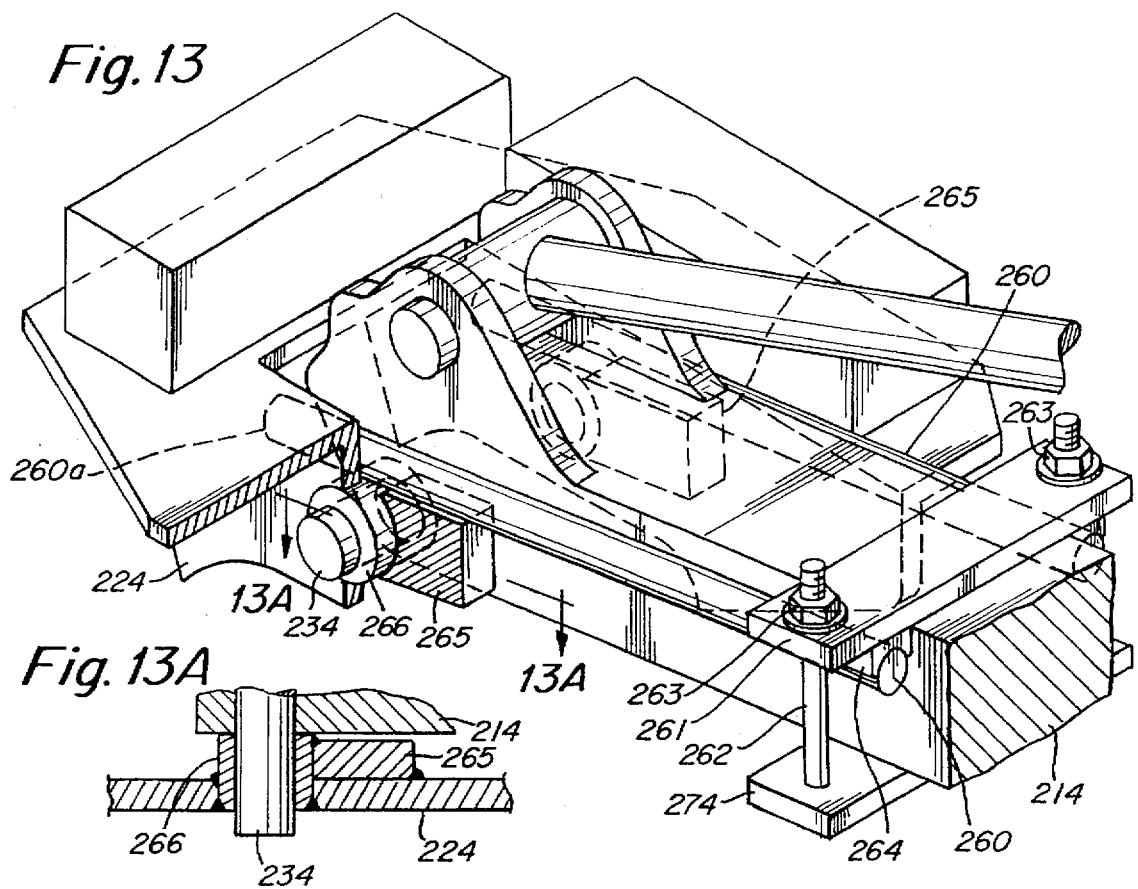
FIG. 13 is a sectional view with part of the pad removed showing a fourth alternate embodiment of the present invention with the stabilizer pad in a gravel or dirt engaging position.
Figure 14:
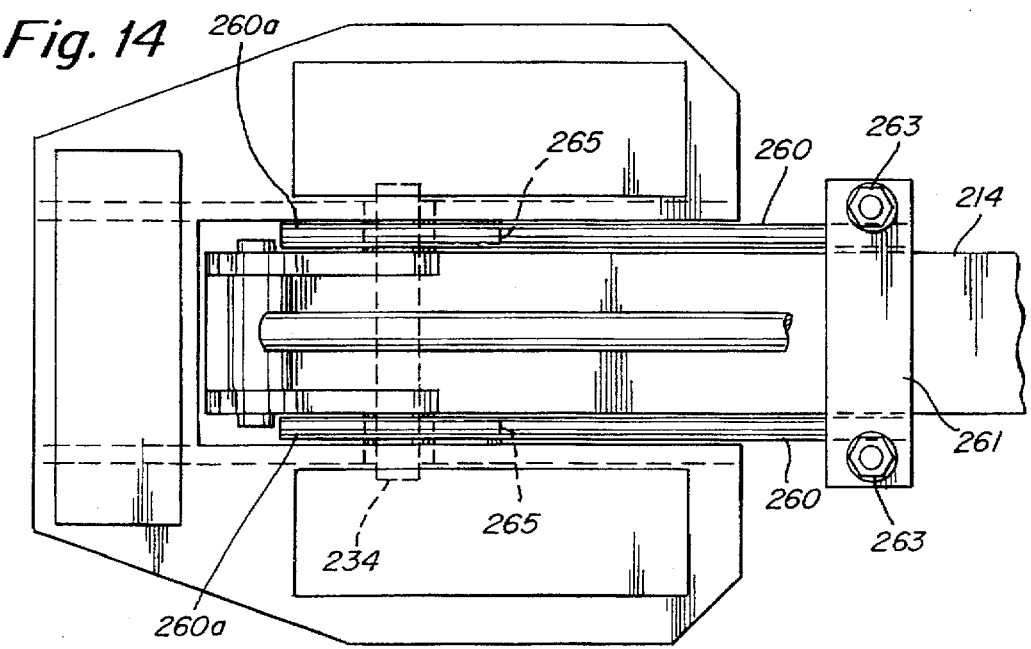
FIG. 14 is a top plan view of the embodiment of FIG. 13 showing two spring rods and two cams.

FIGS. 13 and 14 illustrate a different arrangement for preventing self-flipping of the pad. This arrangement includes support structure comprised of an upper plate 261 and a lower plate 274. These plates are affixed to the stabilizer arm 214 using two threaded bolts 262 and associated threaded nuts 263. The upper plate has two channels 264 disposed on opposite side of the stabilizer arm 214. Each channel is adapted to receive an end of one of two spring rods 260. FIGS. 13 and 14 illustrate these spring rods 260 disposed on either side of the stabilizer arm 214 and extending longitudinally on either side thereof.

The spring rods 260 may be fixed to the channels using, for example, an adhesive. Alternatively, instead of channels, closed cylindrical passages, adapted to receive the ends of the spring rods, may be provided. Furthermore, bolts can be provided to secure each spring rod 260 in place at its respective side of the stabilizer arm 214.

The spring rods 260 are formed of a flexible material. For example, they can be constructed of a relatively stiff hard rubber material. Each of the spring arms extend along opposite sides of the stabilizer arm 214, as illustrated in FIGS. 13 and 14, and are fixed only at the ends supported at the channels 264. The opposite ends 260a are not fixed in place, but extend in a manner over the pin 234 and over a respective cam 265.

Figure 13A:
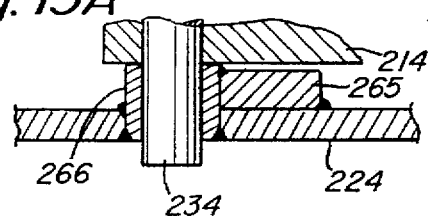
FIG. 13A is a cross-sectional top view taken along line 13A of FIG. 13 showing the cam according to the embodiment of FIG. 13 of the invention.

Two cams 265 are fixed to the flanges 224 and to the journal 266 as shown in FIG. 13A. This allows the cam to rotate along with the pad with respect to the stabilizer arm 214. In FIG. 13A, the cams are welded to the flanges and the journal, however, the cams could be held in place using bolts and nuts.

Figure 15:
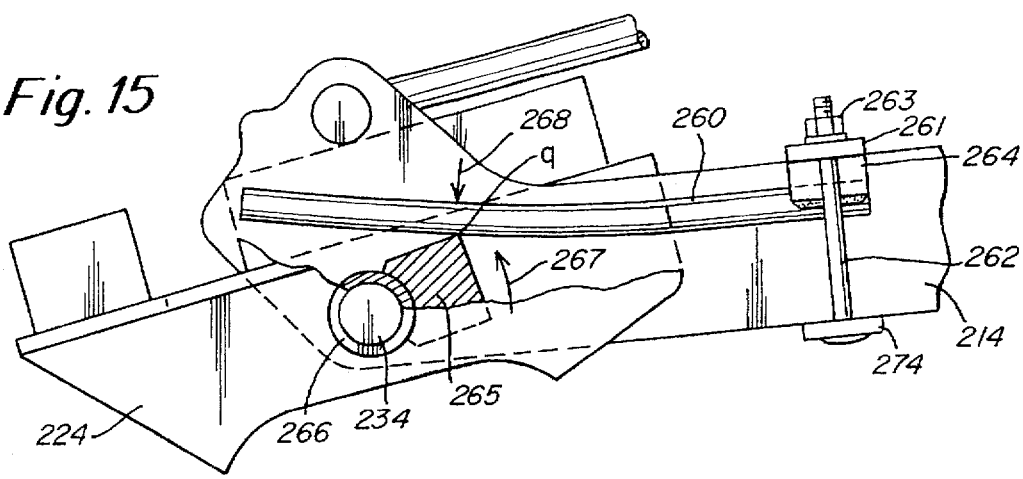
FIG. 15 is a side schematic view of the embodiment of FIG. 13 showing the pad attempting to flip over against the force of the spring arm.
Figure 16:
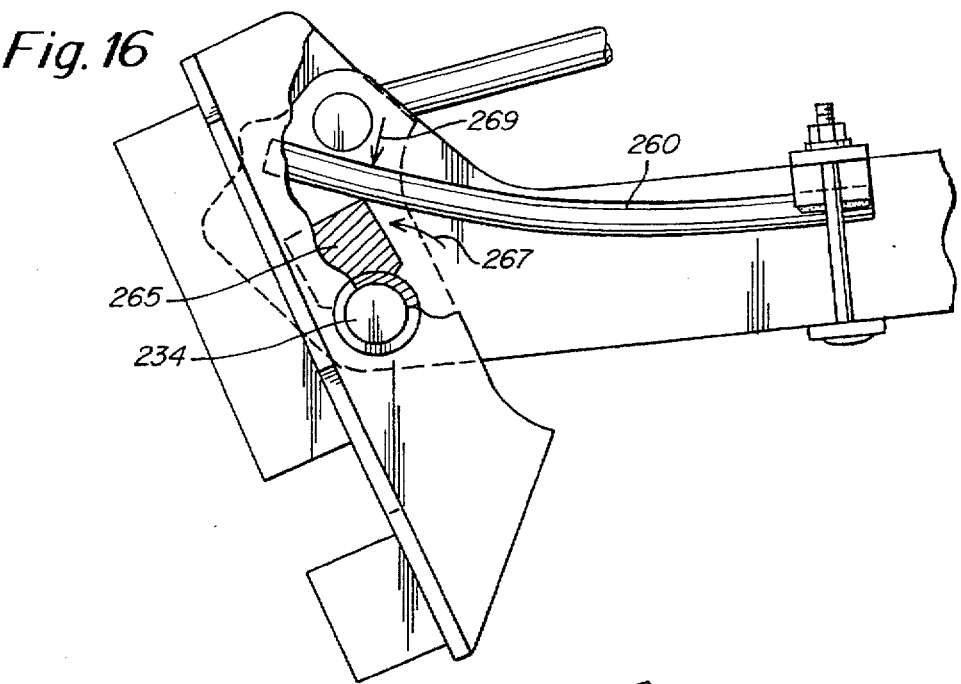
FIG. 16 is a side schematic view of the embodiment of FIG. 13 showing the pad being manually pivoted to the rubber side.

The operation of the embodiment of the invention shown in FIG. 13 will now be described with reference to FIGS. 15-18. FIG. 15 shows the stabilizer pad with the flange side down attempting to rotate to the rubber side as shown by arrow 267. The cam 265 is in contact with the spring rod, and as shown by arrow 268, the spring rod tension resists the rotational movement of the stabilizer pad. The material of the spring rods 260, as well as the diameter and the length of the spring rods, are selected such that the inertia of the pad itself towards self flipping cannot overcome the spring tension of the spring rods. In the described embodiment, two spring rods and two associated cams are provided to create the required spring tension. However, it should be realized that depending upon spring arm material selection and the rotational inertia created by the stabilizer pad, only one spring rod may be required.

As indicated previously, in connection with FIG. 15, the spring rods are used to prevent self-flipping of the pad. However, the materials and dimensions of the rod are also selected so as not to prevent a manual rotation of the pad. Thus, even though there is some force imparted by the spring rods, the force is of a magnitude such that it can be overcome by manual rotation (manual urging) of the pad. In connection with this, refer to FIG. 16 which shows the pad having been manually pivoted toward the rubber side. The direction of rotation is indicated by arrow 269.

Figure 17:
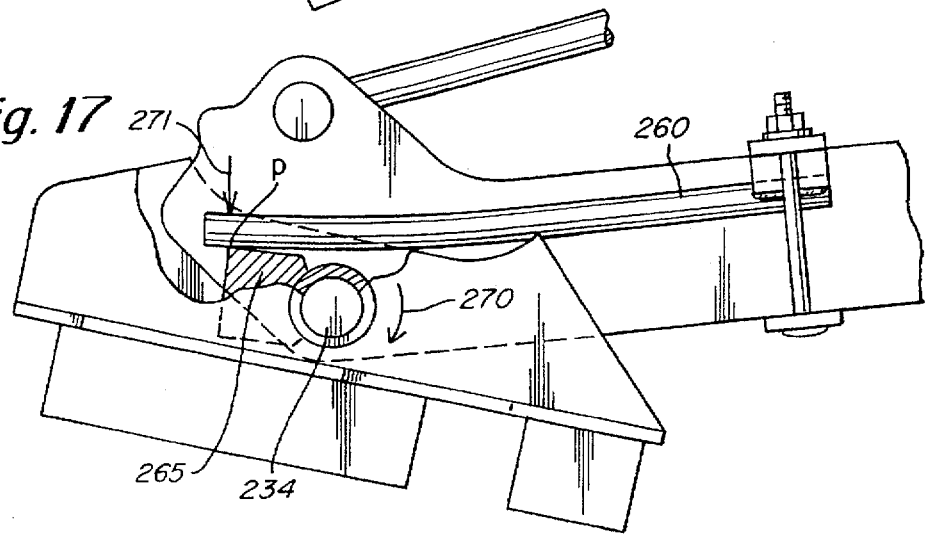
FIG. 17 is a side schematic view of the embodiment of FIG. 13 showing the spring arm indexing the cam to allow the rubber side to evenly contact a flat hard surface.

The present invention also resists self-flipping of the pad from the rubber side to the flange side. FIG. 17 shows the pad with the rubber side down rotating toward the flange side as shown by arrow 270. The cam 265 is in contact with the spring rod at point p, and as shown by arrow 271, the spring rod tension resists the rotational movement of the pad.

The self flipping problem of the stabilizer pad relates primarily to flipping from the flange side down to the rubber side down, because the rubber side is typically much heavier than the flange side. Therefore, a greater force is required to prevent the pad from flipping to the rubber side down position than to the flange side down position. The embodiment of the present invention shown in FIGS. 13-18 provides this greater force against rotation in the direction toward the rubber side down as described below.

FIG. 15 shows the pad rotating in the direction of arrow 267 from the flange side down toward the rubber side down. The cam 265 is in contact with the spring rod 260 at point q. FIG. 17 shows the stabilizer pad rotating in the direction of arrow 270 from the rubber side down to the flange side down. The cam 265 is in contact with the spring rod 260 at point p. Because point q is closer to the fixed end of the spring rod 260 than point p there is a greater force exerted by the spring rod on the cam at point q than at point p. Therefore, there is a greater force against rotation from the flange side to the rubber side than from the rubber side to the flange side.

An additional feature of the present invention will now be described in reference to FIGS. 18 and 19. As previously described, and as shown in FIG. 19, stabilizer pads, according to the prior art, exhibit an undesirable feature as they are emplaced with the rubber side down. As shown in FIG. 19, the pad may engage the ground surface with the face of the pad at an angle to the ground surface rather than horizontal to the ground as desired. When this occurs, it results in uneven wear of the rubber pad and causes the operator of the vehicle to be jolted as the pad engages the ground surface.

Figure 18:
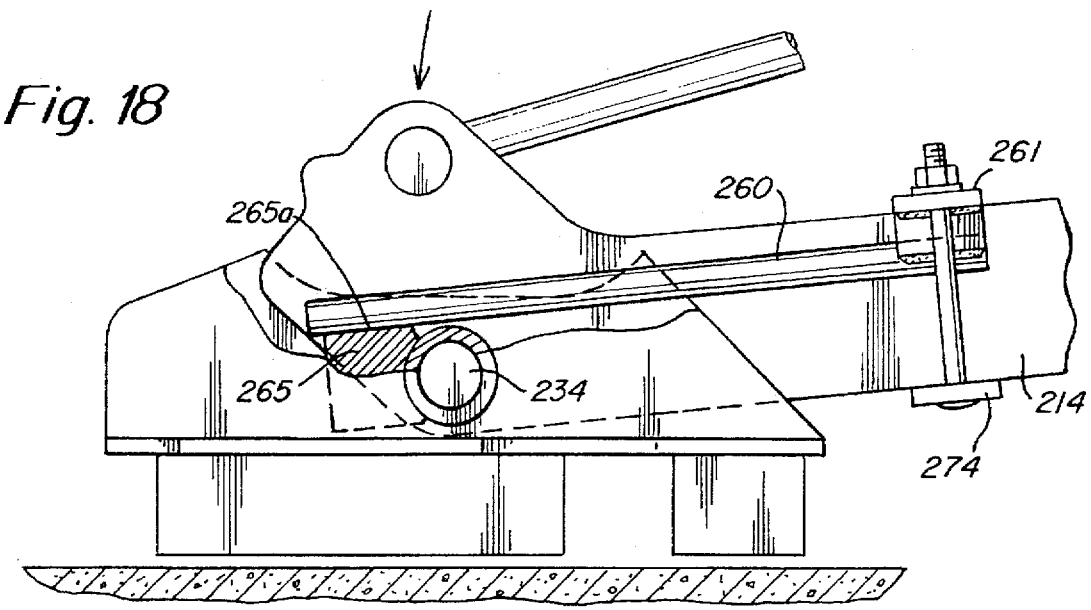
FIG. 18 is a side schematic view of the embodiment of FIG. 13 showing the pad as it engages a finished surface.
Figure 19:
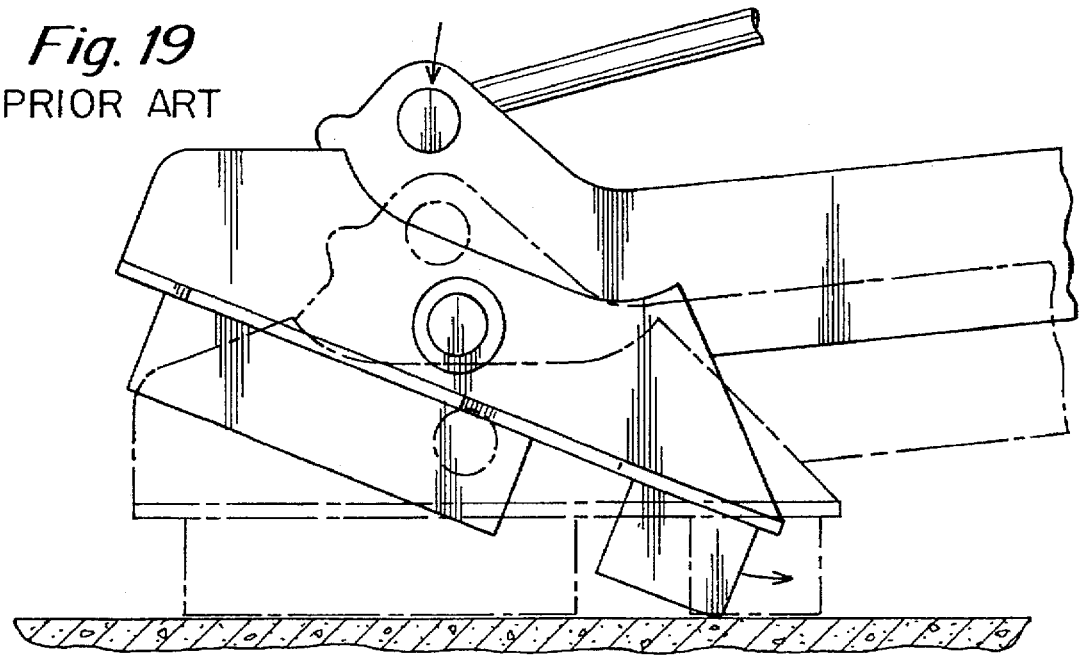
FIG. 19 is a side schematic view of a flip pad according to the prior art showing the pad engaging a finished surface with the surface of the rubber pad at an angle to the ground surface. If this angle is acute enough, the pad will first tend to "stab" at ground and jam. As further force is added, the pad will slip suddenly with a jolt.

In the present invention, as shown in FIG. 18, the cam and the spring rod are constructed and arranged such that a flat portion 265a of the cam 265 is in contact with the spring rod 260 when the pad is in a predetermined rotational position with respect to the stabilizer arm. If the pad begins to rotate from this predetermined position, as shown in FIG. 17, the spring rod will begin to exert a force on the cam at position p to resist this rotation. Because of the force exerted by the spring rod, the pad will tend to stay in the position of FIG. 18. The spring rod and the cam are designed such that this predetermined position is the position that results in the face of the rubber pad being parallel to the ground surface as the pad engages the ground surface. In the manner described above, the present invention provides an indexing or self biasing feature for the stabilizer pad that solves the problem of the prior art.

It should be noted that while this indexing feature was described with respect to the rubber side of the stabilizer pad, it is equally applicable when the flange side is down as shown in FIG. 13. However, this feature is less critical with the flange side down since this side of the pad is designed to engage an uneven ground surface.

An additional embodiment of the present invention for preventing self-flipping of a stabilizer pad is shown in FIGS.

Figure 20:
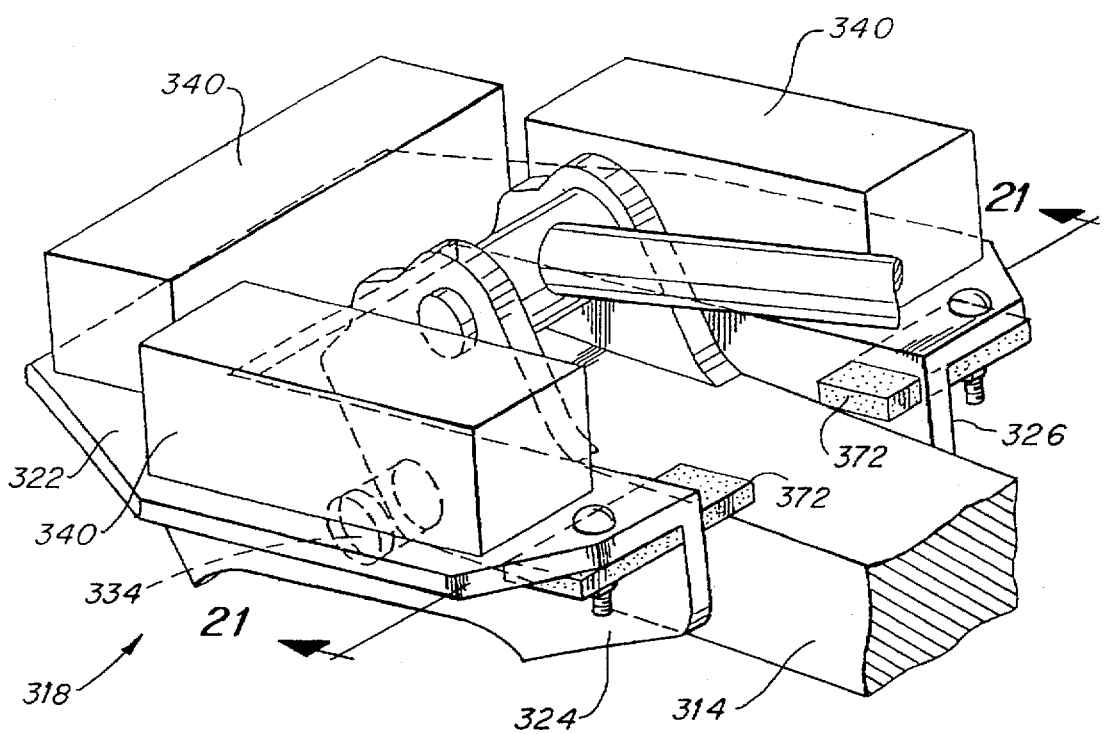
FIG. 20 is a perspective view of a fourth alternate embodiment of the present invention.
Figure 21:
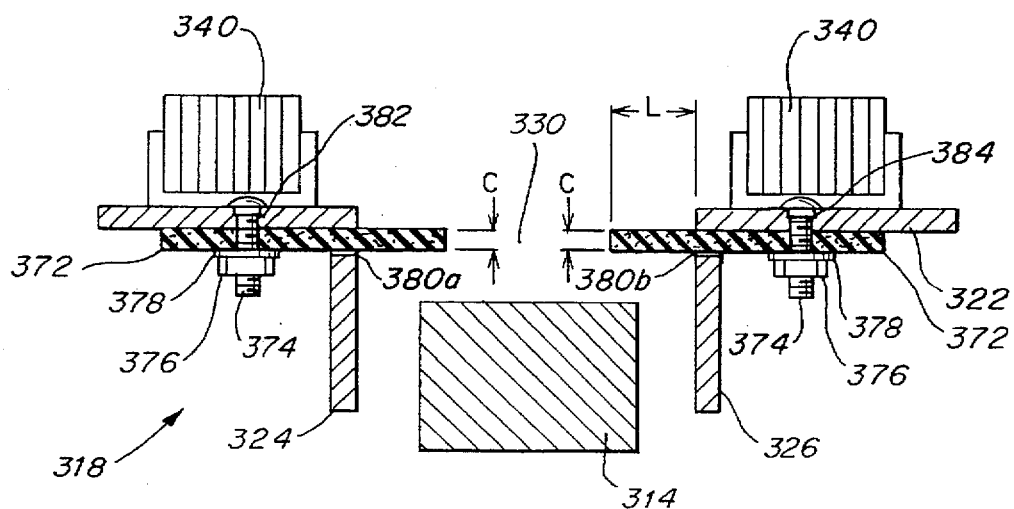
FIG. 21 is a cross-sectional end view of the embodiment of the invention shown in FIG. 20 taken along line 21—21 of FIG. 20.

20 and 21. As shown in FIG. 20, a stabilizer pad 318 is coupled to a stabilizer arm 314 using a pin 334, as in previously described embodiments of the invention. The stabilizer pad has a notch 330 to accommodate the arm 314 and to allow rotation of the arm with respect to the stabilizer pad. The stabilizer pad 318 comprises a steel plate 322, which is adapted to contact the ground with either side of the plate facing downwards. In FIGS. 20 and 21, the stabilizer pad 318 is shown with a side, having flanges 324 and 326 for contacting soft earth, facing downward. The other side of the steel plate 322, having rubber pads 340 for contacting hard surfaces, is shown facing upward.

Two high-friction resilient strips 372 are fixed to the steel plate 322 and have a length that extends into the notch 330 through holes 380a and 380b in the flanges 324 and 326 respectively. Each of the strips 372 are fixed to the soft earth contacting side of the steel plate 322 using a carriage bolt 374, a lock washer 378 and a nut 376. The carriage bolts pass through holes 382 and 384 of the steel plate. In one embodiment, the carriage bolts 374 have a square neck to prevent them from turning as the nuts 376 are tightened.

The resilient strips 372 are formed of rubber or another flexible, abrasion resistant material, such as spring-tempered metal or neoprene. Preferably, the material also has a relatively high coefficient of friction, e.g., rubber or neoprene.

Figure 22:
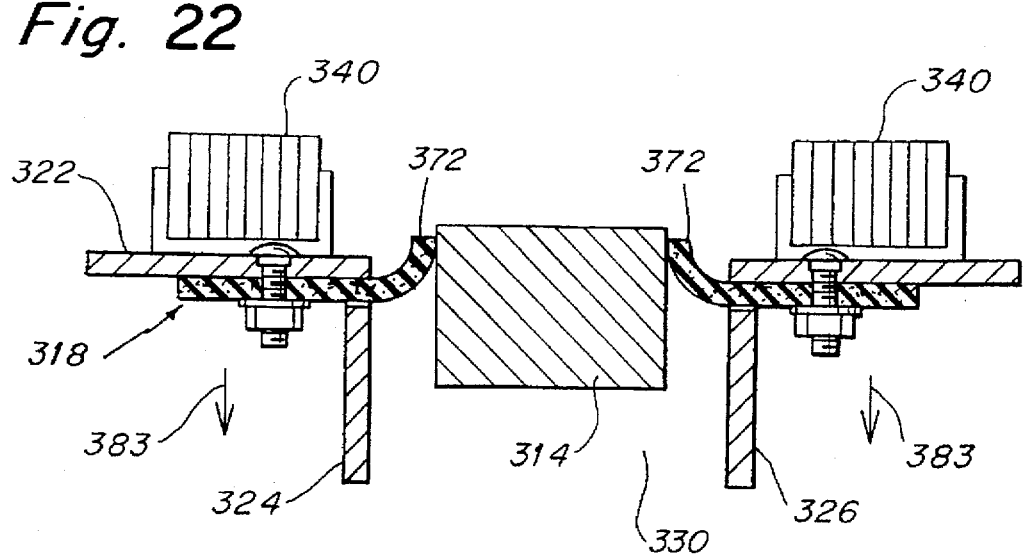
FIG. 22 is a cross-sectional end view similar to FIG. 21 showing the arm and pad in a first relative rotational position.
Figure 23:
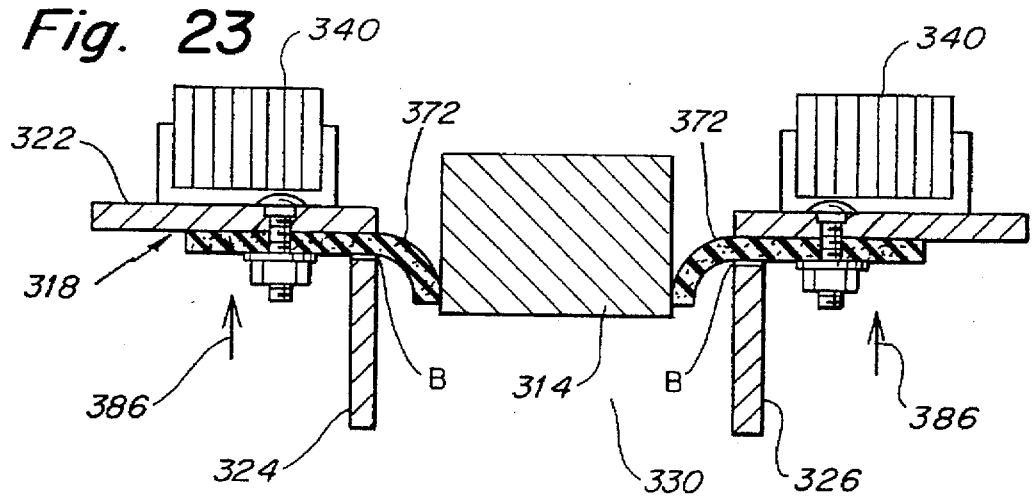
FIG. 23 is a cross-sectional end view similar to FIG. 21 showing the arm and pad in a second relative rotational position.

FIGS. 22 and 23 show the flexing of the resilient strips 372 as the stabilizer pad 318 rotates with respect to the stabilizer arm 314. In FIG. 22, the stabilizer pad 318 moves in a direction, indicated by arrows 383, with respect to the arm 314. The direction of rotation shown in FIG. 22 corresponds to a clockwise rotation of the pad with respect to the arm as shown in FIG. 20. In FIG. 23, the stabilizer pad moves in a direction, indicated by arrows 386, with respect to the arm 314. The direction of rotation shown in FIG. 23 corresponds to a counter-clockwise rotation of the pad with respect to the arm as shown in FIG. 20.

As shown in FIGS. 22 and 23, the portions of the resilient strips 372 that extend into the notch 330 become trapped between flanges 324 and 326 and the arm 314, flex in a direction opposite to the direction of the movement of the pad with respect to the arm, and provide a frictional resistance to further rotation of the stabilizer pad with respect to the arm. The surface coefficient of friction of the material used for the resilient strips 372 and the thickness C of the resilient strips is selected such that the inertia of the stabilizer pad itself toward self-flipping cannot overcome the frictional resistance, but application of manual pressure to further rotate the pad can overcome the frictional resistance to rotate the pad to provide flipping when desired. In the embodiment of the invention shown, the pad is not able to self-flip accidentally solely under its own inertia.

In a preferred embodiment, the resilient strips 372 each has an overall length of approximately 4 inches, and extends into the notch 330 a distance L equal to approximately 1.5 inches, and the thickness C of the resilient strips is between 5/16 and 3/8 of an inch. As in previous embodiments, it has been found that rubber strips cut from side wall segments of truck-tire carcasses have acceptable material properties in terms of flexibility and surface friction to serve as the resilient strips 372.

Figure 24:
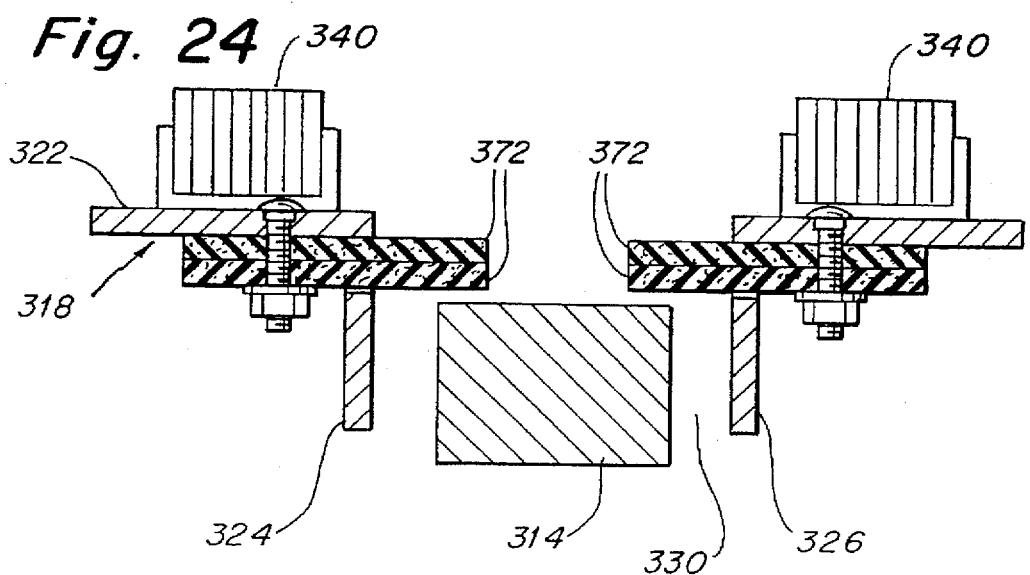
FIG. 24 is a cross-sectional end view, similar to FIG. 21, showing a fifth alternate embodiment of the present invention.

FIG. 24 shows another embodiment of the present invention in which each of the resilient strips 372 of the embodiment shown in FIGS. 20-23 is replaced with a pair of resilient strips 372 stacked together to double the overall thickness. In the embodiment shown in FIG. 24, an increased resistance to rotation, compared with the embodiment shown in FIGS. 20-23, is provided as the force necessary to bend the stacked pair of resilient strips 372 to allow the stabilizer arm 314 to pass through the notch 330 during rotation is greater than the force necessary to bend one of the resilient strips 372. Because of the increased thickness, there is also additional force applied by the resilient strips against the stabilizer arm resulting in an increase in frictional resistance. In the embodiment shown in FIG. 24, two resilient strips 372 are shown stacked together in a laminate structure to double the thickness. Alternatively, one resilient strip having twice the thickness could be provided.

FIG. 25 shows another embodiment of the present invention in which the resilient strip 372 of FIGS. 20-24 is replaced by a resilient strip 373 having approximately double the length of the resilient strip 372. The resilient strip 373 is bent in half and doubled over to provide increased thickness and as a result increased resistance to rotation. Also, by bending the strip over, the portion of the resilient strip 373, extending into the notch 330, will be assured to remain at 90° relative to movement in either direction. The increased thickness also provides an increase in rigidity to prevent the resilient strip from taking a permanent set over time. In the embodiment shown in FIG. 25, each resilient strip 373 has a through hole near each end of the strip and the bolt 374 holds the two ends together to provide the doubled over configuration. The folded over sections may also be held together using an adhesive.

In the embodiments of the invention shown in FIGS. 20-25, the resilient rubber strips 372 and 373 provide an equal rotational resistance to rotation of the pad with respect to the arm in either the clockwise or the counter-clockwise direction. As previously discussed, it is desirable to provide a greater resistance to rotation in the direction from the rubber pad side up to the rubber pad side down (the counter-clockwise direction of the pad with respect to the arm of FIG. 20) as this is the direction in which the pad has a greater tendency to self-flip.

Figure 28:
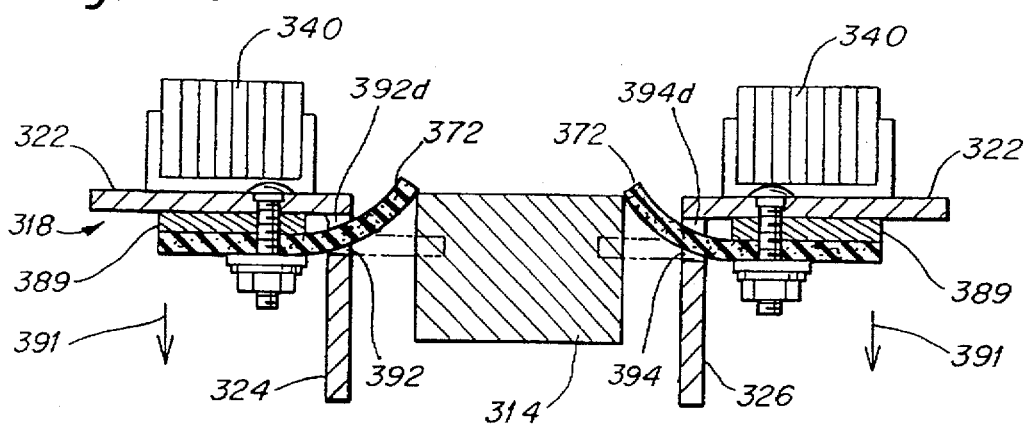
FIG. 28 is a cross-sectional end view, similar to FIG. 21, of an eighth alternate embodiment of the present invention.

FIGS. 26-28 show embodiments of the present invention providing different resistances to rotation depending on a direction of rotation. In FIGS. 26 and 27, enlarged holes 392 and 394 are provided in the flanges 324 and 326 of the stabilizer pad for allowing the resilient strips 372 to pass through the flanges. The holes 392 and 394 have a width approximately twice that of the holes 382 and 384 of the embodiment of the invention shown in FIG. 21. The resilient strips 372, in an unflexed position pass through a top portion of the holes, forming gaps 392a and 394a between the bottom of the resilient strips and the flanges 324 and 326. An enlarged washer or backing plate 390 is provided between each nut 376 and each resilient strip 372 to prevent tearing of the resilient strip 372 due to lessened support of the resilient strip at the flanges 324 and 326.

As shown in FIG. 27, a pivot point of each resilient strip 372 at which the resilient strip flexes as the stabilizer pad moves in a counter-clockwise direction of rotation (with respect to FIG. 20) occurs at point A in FIG. 27, at an edge of the enlarged washers 390, whereas a pivot point of the embodiment of the invention shown in FIG. 23 occurs at point B at an edge of the flanges 324 and 326. Because the pivot point A is further from the end of the resilient strip 372 that contacts the stabilizer arm than pivot point B, there is less force required to bend the resilient strips 372 in FIG. 27 than there is to bend the resilient strips 372 in FIG. 23 as the stabilizer pad moves in the counter-clockwise direction of rotation with respect to the arm. Also, there is less surface area of the resilient strips 372 in contact with the stabilizer arm 314 in the embodiment shown in FIG. 27 than in the embodiment shown in FIG. 23. Therefore, there is less resistance to rotation due to friction created by the contact of the resilient strip 372 with the stabilizer arm 314. In the embodiment of the invention shown in FIGS. 26 and 27, the resistance to rotation of the stabilizer pad with respect to the arm in the clockwise direction will be substantially the same as the resistance to rotation in the embodiment shown in FIGS. 20–23. Therefore, the embodiment shown in FIGS. 26 and 27 provides greater resistance to rotation in the clockwise direction than in the counter-clockwise direction.

As discussed above, it is desirable to provide a greater resistance to rotation in the counter-clockwise direction than in the clockwise direction to prevent the pad from self-flipping from the flange side down to the rubber pad side down. FIG. 28 shows another embodiment of the invention in which a greater resistance to rotation is provided in the counter-clockwise direction than in the clockwise direction.

In the embodiment of the invention shown in FIG. 28, shims 389 are added to the embodiment of the invention shown in FIGS. 26 and 27 between the resilient strips 372 and the steel plate 322. In FIG. 28 the resilient strips 372 are shown in a flexed position with the stabilizer pad 318 moving in a clockwise direction with respect to the arm 314, and are shown in phantom in an unflexed position. The shims 389 have a sufficient thickness such that the resilient strips 372 contact the bottom of holes 392 and 394 when the resilient strips 372 are in the unflexed position such that gaps 392d and 394d are located between the resilient strips 372 and the steel plate 322.

FIG. 28 shows the stabilizer pad moving in the direction of arrows 391 with respect to the stabilizer arm 314. This corresponds to the clockwise direction with respect to FIG. 20. In this direction, due to the gaps 392 and 394d, there is less resistance to rotation than in the opposite or counter clockwise direction.

It should be understood that the embodiments of the invention shown in FIGS. 23–25, in which the thickness of the resilient strips 372 is doubled, may be incorporated in the embodiments of the invention shown in FIGS. 26–28.

In the embodiments of the invention shown in FIGS. 20–28, the resilient strips have been shown extending into the notch 330 such that a length of the resilient strips is substantially perpendicular to the flanges 324 and 326. The resilient strips may be arranged to extend into the notch such that an angle other than 90 degrees is formed between a length of the resilient strips and the flanges. As will be understood by those skilled in the art, in this manner, a greater rotational resistance can be provided in one direction of rotation of the pad with respect to the arm than in the other direction of rotation of the pad with respect to the arm.

Figure 29:
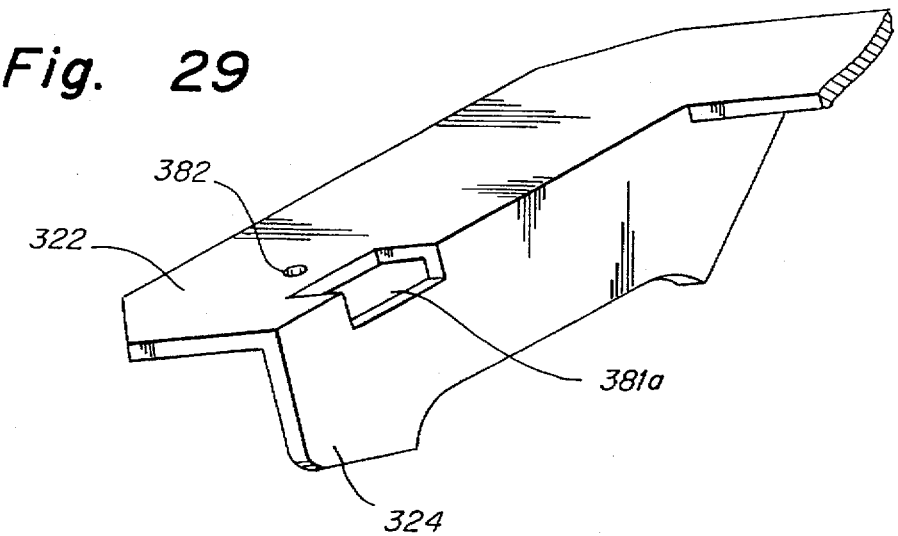
FIG. 29 is a fragmentary perspective view showing an alternate configuration of a stabilizer pad used in embodiments of the present invention.
Figure 30:
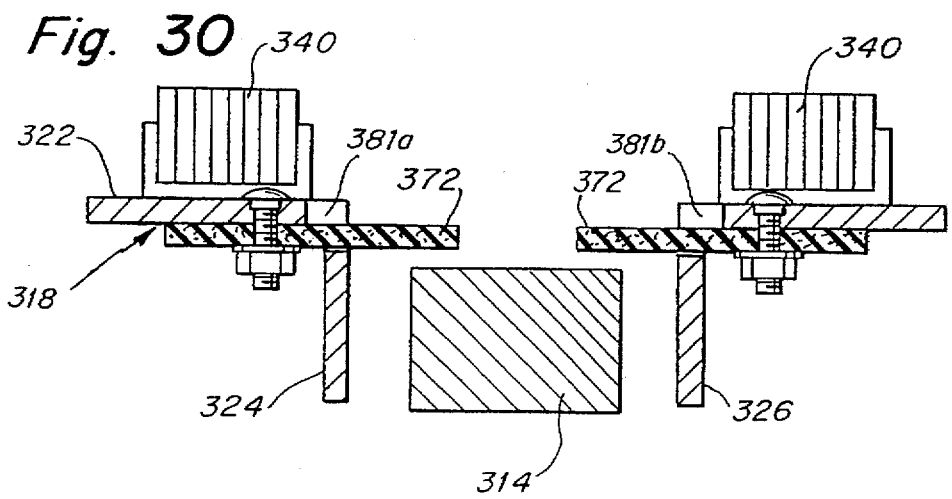
FIG. 30 is a cross-sectional end view, similar to FIG. 21, showing the embodiment of FIG. 21 with the stabilizer pad of FIG. 29 in a first relative rotational position.

FIGS. 29–31 show an alternate embodiment of a stabilizer pad that provides greater rotational resistance of the pad with respect to the arm in a counter-clockwise direction than in the clockwise direction with reference to the pad and arm as shown in FIG. 20. The embodiment shown in FIGS. 29–31 is similar to the embodiments of FIGS. 20–28 except that in the embodiment shown in FIGS. 29–31 enlarged slots 381a and 381b are included for allowing the resilient strips 372 to pass through the flanges 324 and 326. FIG. 29 provides a sectional view of a stabilizer pad showing only the flange 324 and a section of the steel plate 322. As shown in FIG. 29, an enlarged slot 381a is formed by cutting out a section of the flange 324 and the steel plate 322. As shown in FIG. 30 an enlarged slot 381b, similar to the enlarged slot 381a, is formed in the flange 326 and the steel plate 322.

The configuration of the enlarged slots 381a and 381b allows the resilient strips 372 to provide greater rotational resistance in the counter-clockwise direction of the pad with respect to the arm. FIG. 31 shows the stabilizer pad and arm in relative rotational movement with the pad moving in the direction of arrows 393, corresponding to the clockwise direction of FIG. 20. In this direction of movement, there is less resistance to rotation than in the opposite direction as the resilient strips 372 can freely bend in the enlarged slots 381a and 381b. In the opposite direction of that shown by arrows 393, the resilient strips provides a greater rotational resistance as the resilient strips 372 become trapped between the stabilizer arm and the pad similar to the embodiment shown in FIG. 23.

The enlarged slots used in the embodiments of FIGS. 29–31 may also be used with the bent over resilient strips 373 shown in FIG. 25 or with the laminate structure of resilient strips 372 shown in FIG. 24.

Another alternate embodiment of the present invention is shown in FIG. 32. The embodiment shown in FIG. 32 is similar to the embodiments of FIGS. 20–23 except that steel shims 397 are added between the resilient strips 372 and the steel plate 322. As shown in FIG. 32, the steel shims 397 extend beyond the flanges 324 and 326 into the notch 330. A length of each steel shim 397 into the notch 330 is less than a length of each resilient strip 372 into the notch. This allows the resilient strips 372 to become trapped between the arm and one of the steel shims 397 when the stabilizer pad moves in the direction of arrows 393 relative to the arm 314. When the stabilizer pad moves in the direction opposite arrows 393, the resilient strips 372 are less compressed than in the direction of the arrows. In this manner, the embodiment shown in FIG. 32 operates similar to the embodiments shown in FIGS. 7–9.

In the embodiment of the invention shown in FIG. 32, the direction of greatest rotational resistance can be changed by altering the relative position of the resilient strips 372 and the steel shims 397 such that each of the resilient strips is located between one of the steel shims and the steel plate 322.

Another alternate embodiment of the present invention will be described with reference to FIGS. 33 and 34. Resilient strips 372 extends through a cut-out in the flanges 324 and 326 similar to the embodiment of the invention shown in FIGS. 20–23. However, the embodiment shown in FIG. 33 differs from that of FIGS. 20–23 in that the resilient strips 372 are bolted to each of the flanges 324 and 326 rather than to the steel plate 322 as in FIGS. 20–23. The resilient strips 372 are bolted to the flanges 324 and 326 using bolts 374, washers 378 and nuts 376. As shown in FIG. 33, the head of each of the bolts 374 extends into the notch 330.

FIG. 34 shows the stabilizer pad in relative rotational movement with the arm 314 in a direction indicated by arrows 399. This direction corresponds to the counter-clockwise direction of FIG. 20. In this direction of rotation, the resilient strips 372 provide a greater resistance to rotation than in the opposite, or clockwise direction. In the direction shown in FIG. 34, each of the resilient strips 372 becomes trapped between the arm 314 and one of the heads of the bolts 374 causing an increase in rotational resistance. The resilient strips 372 operate similar to the resilient strips shown in the embodiment of the invention in FIG. 22 when the stabilizer pad moves in the direction opposite of arrows 399.

In the embodiment of the invention shown in FIGS. 34 and 35, increased rotational resistance in the direction indicated by arrows 399 may be provided by adding washers under the heads of each of the bolts to reduce a gap between the head of the bolt and the arm 314.

In previous embodiments of the invention, resilient strips have extended into the notch area 330 of stabilizer pads through rectangular holes cut in the flanges 324 and 326. In FIG. 35, an alternate cut-out arrangement of flange 324 is shown. It being understood that flange 326 may have a similar cut-out. In FIG. 35 only the steel plate 322, and the flange 324 are shown for simplicity. A channel 398 is cut into the end of flange 324 to accommodate any of the resilient strips in the embodiments of the invention previously described. The use of the channel 398 instead of a slot as described in previous embodiments may provide ease in manufacturing.

An alternative embodiment of a stabilizer pad 418 that provides rotational resistance of the stabilizer pad with respect to the stabilizer arm 414 is shown in FIGS. 36 and 37. The stabilizer pad 418 is coupled to the stabilizer arm 414 using a pin 434 as in previously described embodiments of the invention. The stabilizer pad has a notch 430 to accommodate the arm 414 and to allow rotation of the arm with respect to the stabilizer pad. The stabilizer pad 418 comprises a steel plate 422, which is adapted to contact the ground with either side of the plate facing downwards. In FIGS. 36 and 37, the stabilizer pad 418 is shown with a side, having flanges 424 and 426 for contacting soft earth, facing downward. The other side of the steel plate 422, having rubber pads 440 for contacting hard surfaces, is shown facing upward.

High-friction resilient strips 472 are fixed to each flange 424 and 426. Two resilient strips 472 are fixed to each of the flanges 424 and 426, one of the resilient strips on each of the flanges being aft of the pin 434, and one of the resilient strips 472 on each of the flanges being fore of the pin 434, the fore side of the plate being defined as the side with the notch 430. Each of the resilient strips 472 have first and second ends 472a and 472b fixed to one of the flanges using a carriage bolt 474, a lock washer 478 and a nut 476. The carriage bolts pass through holes in the flanges 424 and 426. As in previously discussed embodiments of the invention, the carriage bolts may have square necks to prevent them from turning as the nuts 476 are tightened. Each of the resilient strips 472 are folded over such that a portion of the resilient strip near the first end 472a is in contact with a portion of the resilient strip near the second end 472b. A middle section 472c of each resilient strip 472 extends into the notch 430.

As shown in FIG. 37, the middle section 472c of each of the resilient strips 472 contacts the stabilizer arm 414 as the stabilizer pad rotates with respect to the stabilizer arm to provide resistance to rotation as in previously described embodiments of the present invention.

FIG. 38 shows yet another embodiment of the present invention. In FIG. 38, a distance d between a pair of bolts 474 used to attach each of the resilient strips 472 to one of the flanges is increased as compared with the embodiment of the invention shown in FIGS. 36 and 37. By increasing the distance between the bolts, a height h of each of the resilient strips extending into the notch 430 of the stabilizer arm 418 is reduced, decreasing the rotational resistance provided by the resilient strips 472.

In the embodiments of the invention shown in FIGS. 36–38, there are four resilient strips 472 fixed to the stabilizer pad 418. It should be understood that more or less resilient strips could be provided to vary the resistance to rotation. As with previously described embodiments of the invention, it has been found that rubber strips cut from side wall segments of truck-tire carcasses have acceptable material properties in terms of flexibility and surface friction to serve as the resilient strips 472. Also rubber strips cut from industrial conveyor belts have been found to have acceptable material properties to serve as the resilient strips 472.

Figure 40:
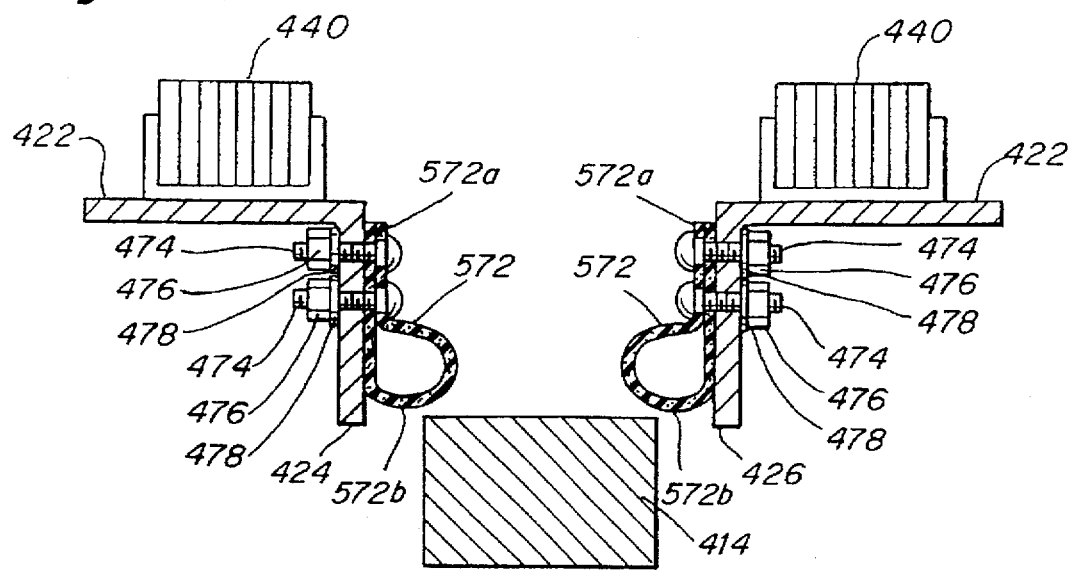
FIG. 40 is a cross-sectional end view of the embodiment of the invention show in FIG. 39 taken along line 40—40 of FIG. 39.
Figure 41:
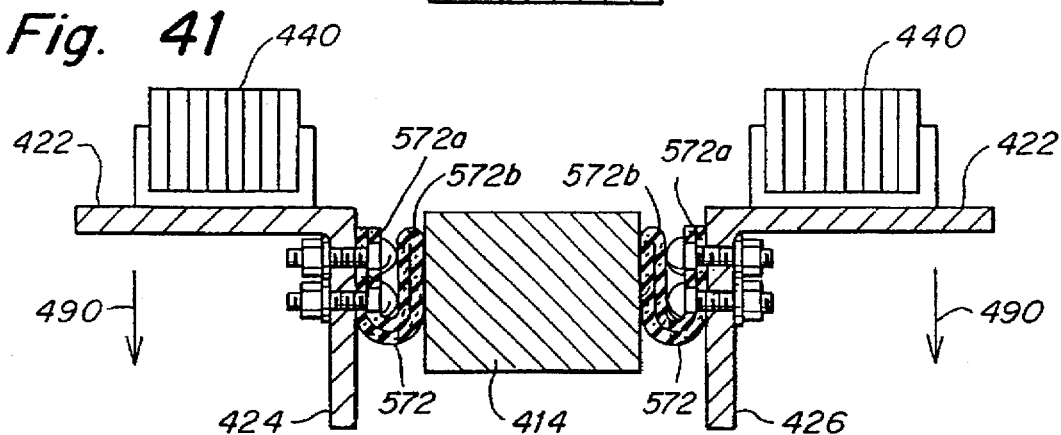
FIG. 41 is a cross-sectional end view, similar to FIG. 40, with the arm and the pad in a first relative rotational position.

Another alternate embodiment of the present invention is shown in FIGS. 39–41. In this embodiment, the resilient strips 472 of the embodiment of the invention shown in FIGS. 36 and 37 have been replaced with resilient strips 572. Each of the resilient strips 572 are connected to the flanges 424 and 426 using two sets of bolts 474, nuts 476, and washers 478. Two resilient strips 572 are fixed to each of the flanges 424 and 426, one of the resilient strips being aft of the pin 434, and one of the resilient strips being fore of the pin 434.

Each of the resilient strips 572 are folded over to create a loop end 572b and a fastener end 572a. The fastener end of each resilient strip is coupled to one of the flanges. As shown in FIG. 39, the resilient strips fore of the pin are oriented such that the fastener side 572a of the resilient strips is closest to the rubber pad side of the plate 422. The resilient strips closest to the aft side of the stabilizer pad are oriented such that the loop side 572b of the resilient strips is closest to the rubber pad side of the plate 422.

FIG. 41 shows compression of the resilient strips 572 as the stabilizer pad moves in the direction shown by arrow 490. The loop side 572b of each resilient strip becomes trapped between the fastener side of the resilient strip and the stabilizer arm creating a resistance to rotation of the stabilizer pad with respect to the stabilizer arm.

Figure 42:
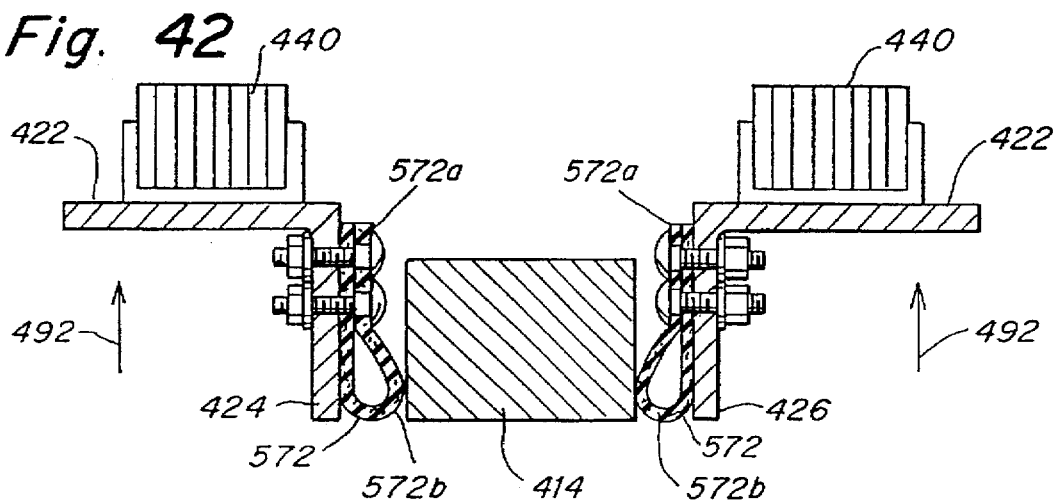
FIG. 42 is a cross-sectional end view similar to FIG. 40 with the arm and the pad in a second relative rotational position.

FIG. 42 shows compression of the resilient strips 572 as the stabilizer pad moves in the direction of arrows 492 (the opposite direction of FIG. 41). The loop side 572b of each resilient strip becomes compressed between the stabilizer arm 414 and one of the flanges 424 and 426. Because the gap between the stabilizer arm and each of the flanges is greater than the gap between the stabilizer arm and the fastener side of the resilient strips, there is a greater force required to compress the resilient strip in the relative rotational position shown in FIG. 41 than in the relative rotational position shown in FIG. 42. Therefore, there is greater resistance to rotation in the direction shown in FIG. 41 than in FIG. 42.

In FIGS. 41 and 42, the resilient strips 572 are oriented with the fastener side 572a closest to the rubber pad side of the plate 22. It should be understood that by orienting the resilient strips with the loop side closest to the rubber pad side of the plate, the direction of greatest rotational resistance will be opposite that described above (in the direction of arrow 492). Although more than one resilient strip is used in each of FIGS. 39–42, it should be understood that any number of resilient strips may be used to vary the rotational resistance.

Figure 43:
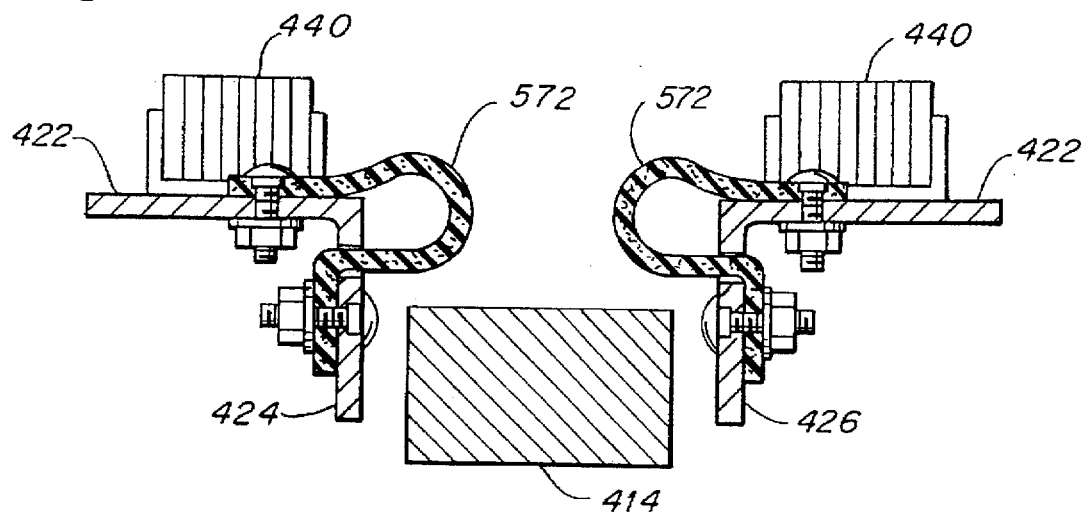
FIG. 43 is a cross-sectional end view, similar to FIG. 42, of a thirteenth alternate embodiment of the present invention in a first relative rotational position.
Figure 44:
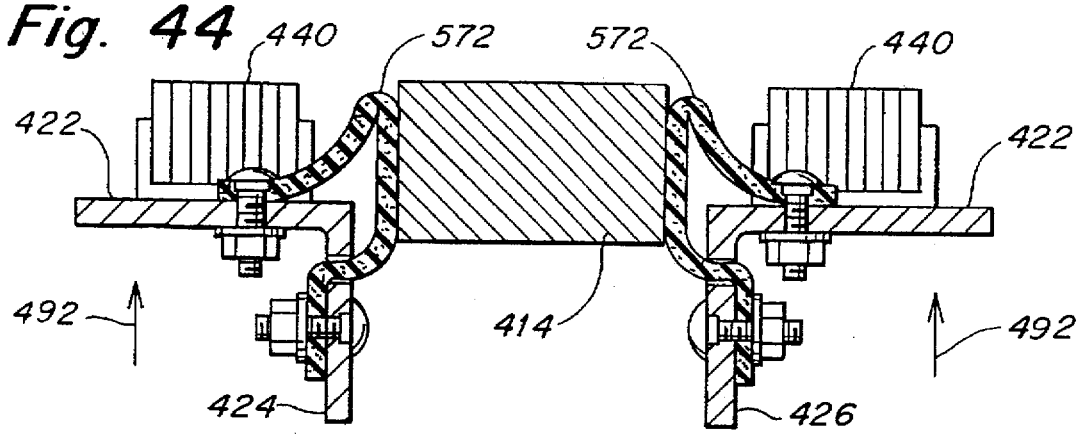
FIG. 44 is a cross-sectional end view, similar to FIG. 43 of the thirteenth embodiment in a second relative rotational position.
Figure 45:
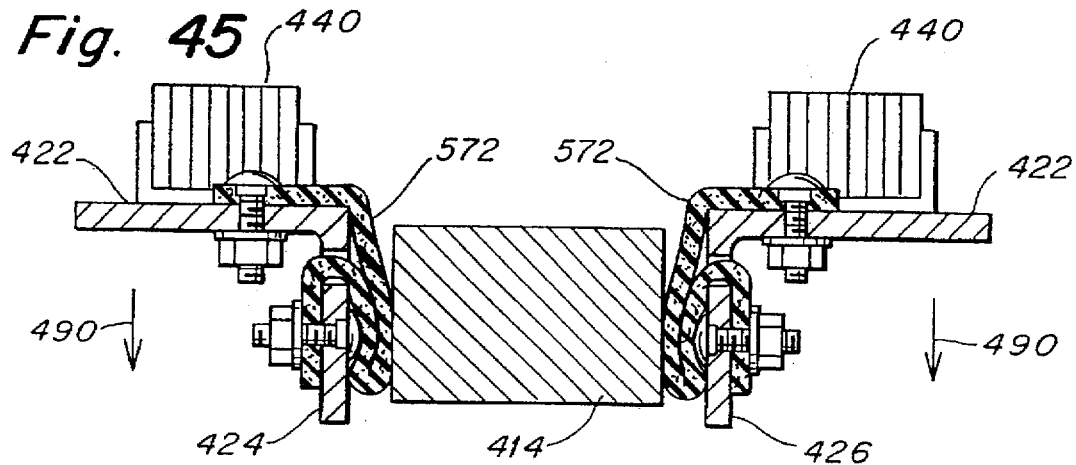
FIG. 45 is a cross-sectional end view, similar to FIG. 44 of the thirteenth embodiment in a third relative rotational position.

Another alternate embodiment of the present invention using resilient strips 572 is shown in FIG. 43. In the embodiment shown in FIG. 43, resilient strips 572 have a first end bolted to one of the flanges 424 and 426, similar to the embodiment of the invention shown in FIGS. 33 and 34. However, unlike the embodiment of FIGS. 33 and 34, each of the resilient strips 572 in FIG. 43 has a second end bolted to a top side of the steel plate 422. FIGS. 44 and 45 show the compression of the resilient strips 572 as the pad moves in the direction of arrows 492 in FIG. 44 and in the direction of arrows 490 in FIG. 45 with respect to the arm 414. As shown in FIGS. 44 and 45, there is a greater compression of the resilient strips 572 in the direction shown by arrows 490 in FIG. 45 than there is in the direction shown in FIG. 44. Accordingly, the resilient strips 572 provide a greater rotational resistance in the direction shown in FIG. 45 than in the direction shown in FIG. 44.

An alternate scheme for coupling the resilient strips 372 of the embodiment of the invention shown in FIGS. 20–23 to the steel plate 322 is shown in FIG. 46. In FIG. 46, each resilient strip 372 is fixed to the rubber pad side of the steel plate 322 using bolts 374, nuts 376, and washers 378.

In the embodiment shown in FIG. 46, there is a greater resistance to rotation of the stabilizer pad with respect to the arm in the counter-clockwise direction than in the clockwise direction (with reference to the pad and arm as shown in FIG. 20). When the stabilizer pad moves in the counter-clockwise direction, each of the resilient strips 372 will bend at pivot point n as the resilient strip engages the stabilizer arm 314. When the stabilizer pad rotates in the clockwise direction, each of the resilient strips will bend at pivot point m as the resilient strip engages the arm 314. As in previously described embodiments of the invention, because pivot point n is closer to the point at which the stabilizer arm engages the resilient strip than point m, a greater force is required to bend the resilient strip at point n than at point m. This results in a greater rotational resistance to counter-clockwise rotation of the stabilizer pad with respect to the arm than to clockwise rotation.

In exemplary embodiments of the present invention, described above, resilient strips have been described as being fixed to a stabilizer pad or a stabilizer arm. It should be understood that the resilient strips may be fixed to either, or both, the stabilizer arm and the stabilizer pad to prevent self-flipping of the pad.

Having thus described particular embodiments of the invention, various alterations, modifications and improvements will readily occur to those skilled in the art. Such alterations, modifications and improvements as are made obvious by this disclosure are intended to be a part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A stabilizer pad for pivotally coupling to a stabilizer arm of a vehicle to be stabilized such that the stabilizer pad can rotate about said arm over a predetermined range of rotation to engage a ground surface, the stabilizer pad comprising:

a plate having a first ground contact face and a second ground contact face;

a resistance member coupled to the plate so as to engage the stabilizer arm over at least a portion of the predetermined range of rotation to provide a resistance to rotation of the stabilizer pad with respect to the arm.

2. The stabilizer pad of claim 1, wherein the resistance member is a resilient strip having a first end coupled to the plate and a second end that contacts the stabilizer arm over at least a portion of the predetermined range of rotation.

3. The stabilizer pad of claim 2, wherein the resistance member is constructed and arranged to provide a first resistance to rotation of the stabilizer pad with respect to the pad in a first direction, and to provide a second resistance to rotation of the stabilizer pad with respect to the arm in a second direction, the first resistance being greater than the second resistance.

4. The stabilizer pad of claim 3, wherein the resilient strip is constructed and arranged to bend about a first pivot point when engaged by the stabilizer arm as the stabilizer pad rotates with respect to the stabilizer arm in a first direction, and to bend about a second pivot point when engaged by the stabilizer arm as the stabilizer pad rotates with respect to the stabilizer arm in a second direction, the first pivot point being closer to the second end of the resilient strip than the second pivot point.

5. The stabilizer pad of claim 1, wherein the resistance member is a resilient strip having first and second ends coupled to the plate such that a middle section of the resilient strip contacts the stabilizer arm over at least a portion of the predetermined range of rotation.

6. The stabilizer pad of claim 5, wherein the resistance member is constructed and arranged to provide a first resistance to rotation of the stabilizer pad with respect to the pad in a first direction, and to provide a second resistance to rotation of the stabilizer pad with respect to the arm in a second direction, the first resistance being greater than the second resistance.

7. The stabilizer pad of claim 6, wherein the resilient strip is constructed and arranged to bend about a first pivot point when engaged by the stabilizer arm as the stabilizer pad rotates with respect to the stabilizer arm in a first direction, and to bend about a second pivot point when engaged by the stabilizer arm as the stabilizer pad rotates with respect to the stabilizer arm in a second direction, the first pivot point being farther from the second end of the resilient strip than the second pivot point.

8. The stabilizer pad of claim 5, wherein the first and second ends of the resilient strip are coupled to a common point on the stabilizer pad.

9. The stabilizer pad of claim 5, wherein the first ground contact face of the plate has a flange perpendicular to the plate, and wherein the first and second ends of the resilient strip are coupled to the flange.

10. The stabilizer pad of claim 9, wherein the first and second ends of the resilient strip are coupled to a common point on the flange.

11. The stabilizer pad of claim 10, wherein the resistance strip is constructed and arranged to provide a first resistance to rotation of the stabilizer pad with respect to the pad in a first direction, and to provide a second resistance to rotation of the stabilizer pad with respect to the arm in a second direction, the first resistance being greater than the second resistance.

12. The stabilizer pad of claim 1, wherein the resistance member includes at least two resilient strips in a laminated structure, the resistance member having a first end coupled to the plate and a second end that contacts the stabilizer arm over at least a portion of the predetermined range of rotation.

13. The stabilizer pad of claim 12, wherein the resistance member is constructed and arranged to provide a first resistance to rotation of the stabilizer pad with respect to the pad in a first direction, and to provide a second resistance to rotation of the stabilizer pad with respect to the arm in a second direction, the first resistance being greater than the second resistance.

14. The stabilizer pad of claim 13, wherein the resilient strips are constructed and arranged to bend about a first pivot point when engaged by the stabilizer arm as the stabilizer pad rotates with respect to the stabilizer arm in a first direction, and to bend about a second pivot point when engaged by the stabilizer arm as the stabilizer pad rotates with respect to the stabilizer arm in a second direction, the first pivot point being closer to the second end of the resilient strip than the second pivot point.

15. The stabilizer pad of claim 1, wherein the resistance member is constructed and arranged to provide a first resistance to rotation of the stabilizer pad with respect to the arm in a first direction, and to provide a second resistance to rotation of the stabilizer pad with respect to the arm in a second direction, the first resistance being greater than the second resistance.

16. The stabilizer pad of claim 1, wherein the first ground contact face of the plate has at least one flange perpendicular to the face of the plate for contacting a rough ground surface, and the second ground contact face has at least one rubber pad for contacting a smooth ground surface.

17. The stabilizer pad of claim 16, wherein the resistance member is a resilient strip having a first end coupled to the second ground contact face of the plate.

18. The stabilizer pad of claim 17, wherein the plate has a notch through which the arm passes during rotation of the pad with respect to the arm and the resilient strip has a second end that extends into the notch to engage the arm.

19. The stabilizer pad of claim 16, wherein the resistance member is a resilient strip having a first end coupled to the first ground contact face of the plate.

20. The stabilizer pad of claim 19, wherein the plate has a notch through which the arm passes during rotation of the pad with respect to the arm and the resilient strip has a second end that extends into the notch to engage the arm.

21. The stabilizer pad of claim 20, wherein the flange includes an opening and the resilient strip passes through the opening in the flange into the notch.

22. The stabilizer pad of claim 21, wherein the opening in the flange is greater than a cross-section of the resilient strip such that the resilient strip can move in the opening with respect to the flange in at least a first direction when the resilient strip is engaged by the stabilizer arm.

23. A stabilizer for an earth moving apparatus comprising:
an arm extending from said earth moving apparatus;
a stabilizer pad having a plate having first and second ground contact faces and pivotally coupled to said arm such that the stabilizer pad can rotate about the arm over a predetermined range of rotation to engage a ground surface with either ground contact face; and
a resilient resistance member, coupled to one of the stabilizer arm and the stabilizer pad so as to engage the other of the stabilizer arm and the stabilizer pad to provide a resistance to rotation of the stabilizer pad with respect to the arm.

24. The stabilizer of claim 23, wherein the resistance member is a resilient strip having a first end coupled to the plate and a second end that contacts the stabilizer arm over at least a portion of the predetermined range of rotation.

25. The stabilizer of claim 24, wherein the resistance member is constructed and arranged to provide a first resistance to rotation of the stabilizer pad with respect to the pad in a first direction, and to provide a second resistance to rotation of the stabilizer pad with respect to the arm in a second direction, the first resistance being greater than the second resistance.

26. The stabilizer of claim 25, wherein the resilient strip is constructed and arranged to bend about a first pivot point when engaged by the stabilizer arm as the stabilizer pad rotates with respect to the stabilizer arm in a first direction, and to bend about a second pivot point when engaged by the stabilizer arm as the stabilizer pad rotates with respect to the stabilizer arm in a second direction, the first pivot point being closer to the second end of the resilient strip than the second pivot point.

27. The stabilizer of claim 23, wherein the resistance member is a resilient strip having first and second ends coupled to the plate such that a middle section of the resilient strip contacts the stabilizer arm over at least a portion of the predetermined range of rotation.

28. The stabilizer of claim 27, wherein the resistance member is constructed and arranged to provide a first resistance to rotation of the stabilizer pad with respect to the pad in a first direction, and to provide a second resistance to rotation of the stabilizer pad with respect to the arm in a second direction, the first resistance being greater than the second resistance.

29. The stabilizer of claim 28, wherein the resilient strip is constructed and arranged to bend about a first pivot point when engaged by the stabilizer arm as the stabilizer pad rotates with respect to the stabilizer arm in a first direction, and to bend about a second pivot point when engaged by the stabilizer arm as the stabilizer pad rotates with respect to the stabilizer arm in a second direction, the first pivot point being farther from the second end of the resilient strip than the second pivot point.

30. The stabilizer of claim 27, wherein the first and second ends of the resilient strip are coupled to a common point on the stabilizer pad.

31. The stabilizer of claim 27, wherein the first ground contact face of the plate has a flange perpendicular to the plate, and wherein the first and second ends of the resilient strip are coupled to the flange.

32. The stabilizer of claim 31, wherein the first and second ends of the resilient strip are coupled to a common point on the flange.

33. The stabilizer of claim 32, wherein the resistance strip is constructed and arranged to provide a first resistance to rotation of the stabilizer pad with respect to the pad in a first direction, and to provide a second resistance to rotation of the stabilizer pad with respect to the arm in a second direction, the first resistance being greater than the second resistance.

34. The stabilizer of claim 23, wherein the resistance member includes at least two resilient strips in a laminated structure, the resistance member having a first end coupled to the plate and a second end that contacts the stabilizer arm over at least a portion of the predetermined range of rotation.

35. The stabilizer pad of claim 34, wherein the resistance member is constructed and arranged to provide a first resistance to rotation of the stabilizer pad with respect to the pad in a first direction, and to provide a second resistance to rotation of the stabilizer pad with respect to the arm in a second direction, the first resistance being greater than the second resistance.

36. The stabilizer pad of claim 35, wherein the resilient strips are constructed and arranged to bend about a first pivot point when engaged by the stabilizer arm as the stabilizer pad rotates with respect to the stabilizer arm in a first direction, and to bend about a second pivot point when engaged by the stabilizer arm as the stabilizer pad rotates with respect to the stabilizer arm in a second direction, the first pivot point being closer to the second end of the resilient strip than the second pivot point.

37. The stabilizer of claim 23, wherein the resistance member is constructed and arranged to provide a first resistance to rotation of the stabilizer pad with respect to the arm in a first direction, and to provide a second resistance to rotation of the stabilizer pad with respect to the arm in a second direction, the first resistance being greater than the second resistance.

* * * * *